(12) United States Patent
Little et al.

(10) Patent No.: US 11,021,375 B2
(45) Date of Patent: Jun. 1, 2021

(54) METHODS FOR PRODUCING AND USING ALKALINE AQUEOUS FERRIC IRON SOLUTIONS

(71) Applicant: New Sky Energy, LLC, Longmont, CO (US)

(72) Inventors: Charles Deane Little, Longmont, CO (US); Yasmina Yeager, Denver, CO (US)

(73) Assignee: New Sky Energy, LLC, Longmont, CO (US)

( * ) Notice: Subject to any disclaimer, the term of this patent is extended or adjusted under 35 U.S.C. 154(b) by 0 days.

(21) Appl. No.: 17/076,559

(22) Filed: Oct. 21, 2020

(65) Prior Publication Data

US 2021/0113959 A1 Apr. 22, 2021

Related U.S. Application Data

(60) Provisional application No. 62/924,166, filed on Oct. 21, 2019, provisional application No. 63/029,405, (Continued)

(51) Int. Cl.
*C01G 49/00* (2006.01)
*B01D 53/52* (2006.01)
(Continued)

(52) U.S. Cl.
CPC ............ *C01G 49/00* (2013.01); *B01D 53/52* (2013.01); *B01D 53/78* (2013.01); *B01D 53/96* (2013.01);
(Continued)

(58) Field of Classification Search
None
See application file for complete search history.

(56) References Cited

U.S. PATENT DOCUMENTS 3,068,065 A 12/1962 Hartley
3,622,273 A * 11/1971 Roberts ................ B01D 53/523
423/576.6
(Continued)

FOREIGN PATENT DOCUMENTS

DE 516851 1/1931
GB 297114 12/1929
(Continued)

OTHER PUBLICATIONS

Pham, et al. "Kinetics of Fe(III) Precipitation in aqueous solutions at pH 6-9.5.". Geocheimica et Cosmochimica Acta. 70, 640-650 (2006) (Year: 2006).*
(Continued)

*Primary Examiner* — Sheng H Davis
(74) *Attorney, Agent, or Firm* — The Plus IP Firm; Jason Barton

(57) ABSTRACT

Methods for removing reduced sulfur compounds, such as hydrogen sulfide, from fluids employing a ferric iron salt that exhibits unusually high solubility in aqueous, alkaline solutions and has strong affinity for capture and oxidation of reduced sulfur compounds. Alkaline aqueous ferric iron salt and solutions thereof useful for removing reduced sulfur compounds from fluids and various methods of production of such salts and solutions. In addition, methods of regenerating the alkaline aqueous ferric iron salt solutions after capture of hydrogen sulfide or other reduced sulfur compounds, generally by exposure to oxygen in air. The alkali metal carbonate salt preferably comprises potassium carbonate and/or potassium bicarbonate. The alkaline aqueous ferric iron salt solutions generally comprise ferric ions, potassium ions, carbonate ions, and bicarbonate ions, optionally with one or more organic additives. In addition, aqueous-soluble, ferric iron salts and ferric iron containing
(Continued)

solids prepared by removal of aqueous medium from solutions herein.

11 Claims, 4 Drawing Sheets

Related U.S. Application Data filed on May 23, 2020, provisional application No. 63/032,600, filed on May 30, 2020.

(51) Int. Cl.
*C02F 1/72* (2006.01)
*B01D 53/96* (2006.01)
*B01D 53/78* (2006.01)
*C02F 101/10* (2006.01)

(52) U.S. Cl.
CPC ............ *C02F 1/72* (2013.01); *B01D 2251/10* (2013.01); *B01D 2257/304* (2013.01); *C02F 2101/101* (2013.01)

(56) References Cited

U.S. PATENT DOCUMENTS

| | | | |
|---|---|---|---|
| 4,001,385 A | 1/1977 | Sanders | |
| 4,009,251 A | 2/1977 | Meuly | |
| 4,091,073 A | 5/1978 | Winkler | |
| 4,278,646 A | 7/1981 | Lynn et al. | |
| 4,374,104 A | 2/1983 | Primack | |
| 4,649,032 A | 3/1987 | Snavely et al. | |
| 4,684,404 A * | 8/1987 | Kalocsai ................. | C22B 11/04 423/38 |
| 4,911,843 A | 3/1990 | Hunniford et al. | |
| 4,919,914 A | 4/1990 | Smith et al. | |
| 5,338,778 A | 8/1994 | Bedell et al. | |
| 5,705,135 A * | 1/1998 | Deberry ............. | B01D 53/1468 423/220 |
| 5,948,269 A * | 9/1999 | Stone ................... | C02F 1/5245 210/718 |
| 7,704,911 B2 | 4/2010 | Jenab | |
| 8,968,692 B2 * | 3/2015 | Harman ................... | C05D 9/00 423/244.03 |
| 2008/0299026 A1 * | 12/2008 | Bellussi ..................... | C10L 3/10 423/224 |
| 2014/0374104 A1 * | 12/2014 | Seth ........................ | E21B 43/40 166/305.1 |
| 2015/0183656 A1 * | 7/2015 | Farha .................... | C10G 25/003 428/402 |

FOREIGN PATENT DOCUMENTS

| | | |
|---|---|---|
| GB | 611917 | 11/1948 |
| GB | 855421 | 11/1960 |
| SU | 818634 | 4/1981 |
| WO | WO 1992017401 A1 | 10/1992 |
| WO | WO 2005003034 A1 | 1/2005 |
| WO | WO 2009000497 A1 | 12/2008 |
| WO | WO 2018190886 A1 | 4/2017 |

OTHER PUBLICATIONS

Bruno et al. (1992) On the influence of carbonate in mineral dissolution: I. The thermodynamics and kinetics of hematite dissolution in bicarbonate solutions at T = 25° C., Geochimica et Cosmochimica Acta, 56, pp. 1139-1147.
Hem & Cropper (1962) Survey of Ferrous-Ferric Chemical Equilibria and Redox Potentials, in The Chemistry of Iron in Natural Water, Geological Survey Water-Supply Paper 1459, pp. 1-31, U.S. Government Printing Office, Washington.
Kamnev et al. (1991) Mossbauer study of ferric hydroxides and hydroxo complexes and their behavior in alkaline electrolytes, Electrochemica Acta, 36(8): 1253-1257.
Sengupta et al. (1974) Complex Carbonates of Fe (III), Z Anorg Allg Chem, 403:327-336.
Wiheeb et al. (2013) Present technologies for hydrogen sulfide removal from gaseous mixtures, Rev Chem Eng, 29(6): 449-470 (De Gruyter).
ISR/WO issued in corresponding PCT application, Jan. 22.

* cited by examiner

METHODS FOR PRODUCING AND USING ALKALINE AQUEOUS FERRIC IRON SOLUTIONS

CROSS-REFERENCE TO RELATED APPLICATIONS

This application claims the benefit of U.S. provisional applications 62/924,166, filed Oct. 21, 2019, 63/029,405, filed May 23, 2020, and 63/032,600, filed May 30, 2020, each of which is incorporated by reference herein in its entirety.

BACKGROUND

Hydrogen sulfide ($H_2S$) is an extremely corrosive and poisonous gas commonly present in natural gas, oil, biogas and geothermal steams. Hydrogen sulfide removal is necessary for energy production and various industrial processes, such as the production of natural gas, oil, paper, geothermal energy and biological gas (e.g., from landfills, dairies, and wastewater treatment plants). Various technologies exist for hydrogen sulfide removal, such as chemical scavengers (e.g., ferric chloride, monoethanolamine triazine), the Amine-Claus process, liquid redox processes, and packed bed technologies (e.g., SulfaTreat® (M-I LLC, Houston Tex.) and Iron Sponge technologies). Hydrogen sulfide scavengers are a very common method of hydrogen sulfide control. Hydrogen sulfide scavengers are commonly iron-based compounds that react with $H_2S$ and convert it to iron sulfide or pyrite. While effective, these single use chemical technologies consume natural resources, produce hazardous chemical waste, and have high operating costs. There remains a significant need in the art for methods and materials for hydrogen sulfide control appropriate for a variety of industrial application and which are cost-effective.

SUMMARY OF THE INVENTION

The present invention relates to methods and materials for removal of hydrogen sulfide and other reduced sulfur compounds from fluids, including gases and liquids, containing such reduced sulfur compounds. The method involves contacting the fluid with an alkaline aqueous solution containing a selected concentration of ferric ion, Fe(III), wherein the ferric ion is at least substantially or completely dissolved in the aqueous medium forming a solution. Contacting results in capture and oxidation of at least a portion of the reduced sulfur compounds in the fluid, the concomitant formation of ferrous ion, Fe(II), and the formation of Fe(II) sulfide particles which are suspended in the aqueous solution and at least partial removal of reduced sulfur compounds from the fluid. After contact with the fluid, the at least partially reduced alkaline aqueous solution used to remove reduced sulfur and the ferrous sulfide particles suspended in it can be regenerated by treatment with oxygen in air or an alternative oxidizing agent resulting in formation of elemental sulfur which precipitates from the solution and can be collected. In embodiments, capture of the reduced sulfur compound results in formation of one or more iron sulfides, such as, FeS, at least in part as a solid which can be separated from the at least partially reduced aqueous solution, if desired. Iron sulfides can be converted via oxidation to elemental sulfur and ferric iron as is known in the art.

In general, ferric iron salts are virtually insoluble in aqueous solutions above pH 6. In one aspect, the present invention relates to methods for producing ferric iron salts that are unusually soluble in aqueous solutions under alkaline conditions. In one embodiment of the invention, these salts contain anionic ferric-bicarbonate complexes, anionic ferric-carbonate complexes or anionic ferric-carbonate/bicarbonate complexes, optionally with hydroxyl groups, that are negatively charged and that, unlike free ferric cations, are fully water soluble under alkaline conditions. In embodiments, water-soluble ferric iron salts comprise carbonate, bicarbonate or a mixture thereof. In embodiments, water-soluble ferric iron complexes comprise carbonate, bicarbonate or a mixture thereof and hydroxide. In embodiments, the counter-ion of the anionic water-soluble ferric iron complexes is potassium. In embodiments, water-soluble ferric iron salts may be a mixture of different salts.

The present invention also relates to aqueous-soluble, ferric iron salts, aqueous solutions containing such salts and to solids prepared by removing water and aqueous solvent from such solutions. The invention also relates to water-soluble ferric salts that can be purified or isolated from the alkaline aqueous ferric iron salt solution, for example, by extraction of alkaline aqueous ferric iron salt solutions, as described in examples herein, or precipitation by addition of one or more organic solvents to the alkaline aqueous ferric iron salt solutions. The ferric iron salts and ferric iron-containing solids of this invention and aqueous solutions in which such salts and solids are dissolved are useful in various industrial processes. Water and aqueous solutions comprising these salts are particularly useful for removal of reduced sulfur compounds (e.g., $H_2S$) from fluids. Certain solutions of this invention are also useful for at least partial removal of $CO_2$ from fluids containing $CO_2$. Certain solutions of this invention are also useful for the removal of oxygen from fluids. Simultaneous removal of hydrogen sulfide, carbon dioxide and oxygen may be very useful in treating biogas streams, which often contain these gases.

Various methods of synthesis of the water- or aqueous-soluble, ferric iron salts are provided herein.

Furthermore, the present invention relates to methods for using the alkaline aqueous ferric iron salt solutions to treat reduced sulfur-containing fluids. For instance, the alkaline aqueous ferric iron salt solutions may be used to treat $H_2S$-containing gases (e.g., natural gas, biogas, acid gas, geothermal vent gas or foul air from farming, industrial or wastewater operations).

Ferric iron ($Fe^{3+}$) is soluble in acidic aqueous solutions (e.g., below pH 5). Above about pH 5, ferric iron is typically insoluble in water and will form particles of one or more of the known iron oxides (e.g., ferric oxide, ferric oxyhydroxides). The methods of the present invention enable the production of alkaline aqueous solutions having solubilized ferric iron salts that are extremely effective for the treatment of reduced sulfur-containing fluids. In contrast to conventional methods of solubilizing ferric iron at high pH, such alkaline aqueous ferric iron salt solutions may be produced with or without organic additives as described in greater detail below.

DETAILED DESCRIPTION

Figure 1:
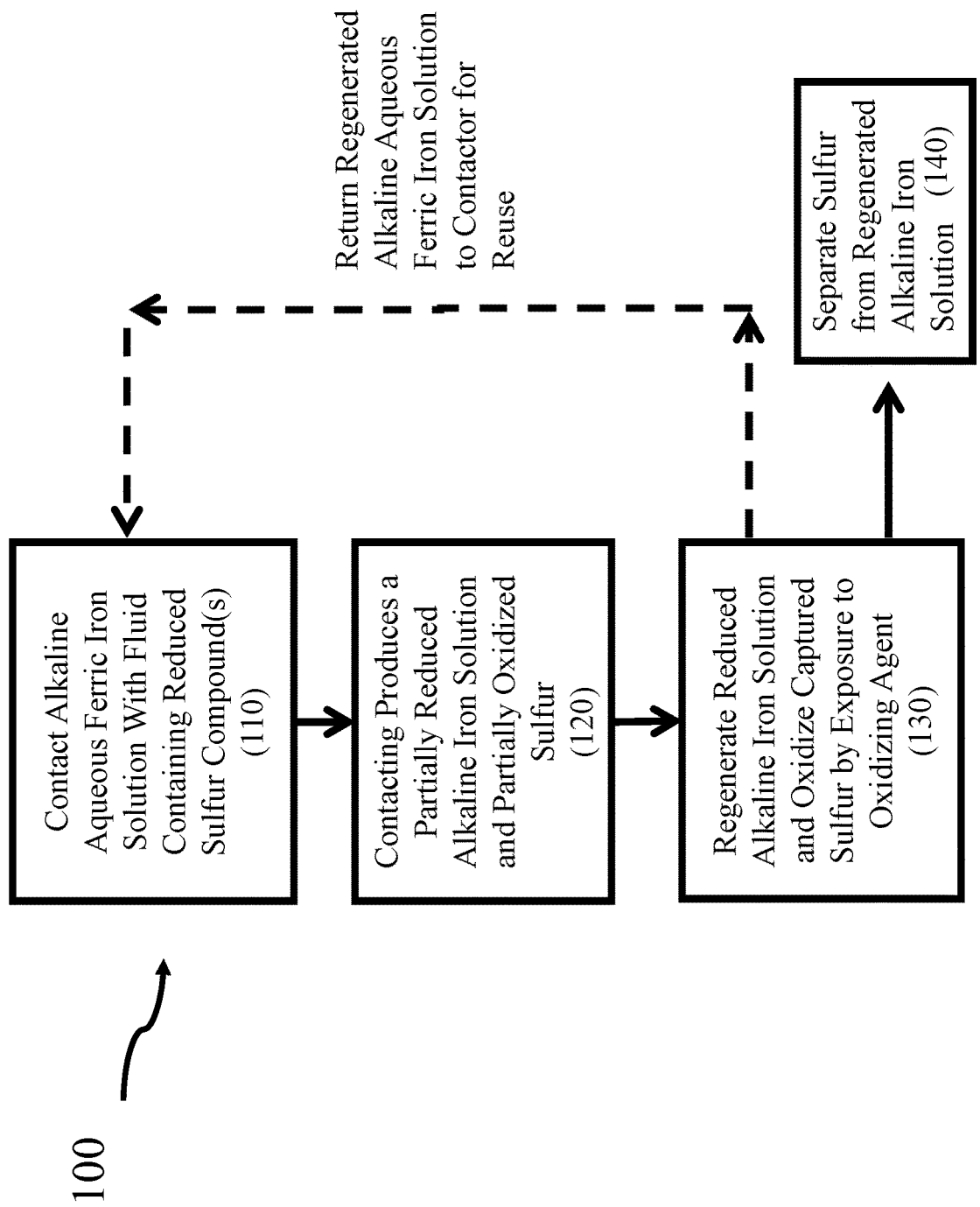
FIG. 1 is an embodiment of a method for treating a reduced sulfur-containing fluid with an alkaline aqueous ferric iron solution.

The invention relates to methods and materials for removing reduced sulfur compounds, particularly hydrogen sulfide ($H_2S$), from fluids containing such reduced sulfur compounds. Materials include alkaline ferric iron salt solutions that can be used to scrub reduced sulfur compounds from the fluids. In embodiments, materials include ferric iron salt solutions that self-assemble into complexes that are unusually soluble in alkaline solutions, and that can be efficiently used to scrub reduced sulfur compounds from the fluids. Materials also include ferric iron-containing solid materials or salts that can be used to prepare alkaline ferric iron solutions useful in methods herein. The invention further provides methods for making alkaline ferric iron salts solutions herein as well as methods for making water-soluble ferric iron salts and ferric iron containing materials which are useful at least for preparation of alkaline ferric iron salt solutions herein.

In embodiments, the invention provides a method for removing reduced sulfur compounds from fluids. In embodiments, the fluids are gases. In embodiments, the fluids are liquids. In particular embodiments the reduced sulfur compound is hydrogen sulfide. The methods herein are particularly useful for treatment of gases, such as hydrocarbon containing gases containing hydrogen sulfide. Fluids containing hydrogen sulfide may, in embodiments, also contain one or more other reduced sulfur compound, such as mercaptans, alkyl disulfides, carbonyl sulfide or carbon disulfide. Fluids containing hydrogen sulfide and/or other reduced sulfur compounds, may, in embodiments, also contain carbon dioxide, oxygen or a combination thereof.

In embodiments, the method for removing reduced sulfur compounds involves contacting an alkaline aqueous ferric iron salt solution as described herein with a reduced sulfur-containing fluid, which contains at least one reduced sulfur compound. In embodiments, the alkaline aqueous ferric iron salt solution comprises ferric ions ($Fe^{3+}$), potassium ions ($K^+$), carbonate ions ($CO_3^{2-}$) and bicarbonate ions ($HCO_3^-$), optionally hydroxide and nitrate ions and optionally contains one or more organic additives. Contacting the ferric iron salt solution and the reduced sulfur-containing fluid produces a reduced alkaline ferric iron solution, and comprises oxidizing at least a portion of the at least one reduced sulfur compound in the fluid and reducing at least a portion of the ferric ions in the solution to ferrous ions ($Fe^{2+}$). Contacting also results in forming one or more iron sulfide compounds in the alkaline aqueous ferric iron solution and thereby removes at least a portion of the reduced sulfur compounds from the fluid. It is believed that the direct reaction of iron with sulfide to form iron sulfide distinguishes this chemistry from other "liquid redox" processes that use organic chelating agents to solubilize iron. In embodiments, at least some portion of the ferric iron remains dissolved in the alkaline ferric iron solution during contacting.

In embodiments, the method further comprises removing iron sulfide compounds from the alkaline at least partially reduced aqueous ferric iron solution after removal of at least a portion of the reduced sulfur compounds from the fluid. In embodiments, the method further comprises separation of iron sulfide compounds from the alkaline at least partially reduced aqueous ferric iron solution by precipitation, settling, centrifugation or filtration. Such separation can be accomplished by methods that are well known in the art. In embodiments, the method further comprises oxidizing at least a portion of the ferrous iron formed in the reduced alkaline aqueous ferric iron solution back to ferric iron to at least in part regenerate the aqueous ferric iron solution. In embodiments, the method further comprises exposing the reduced alkaline iron solution to an oxidizing agent to oxidize at least a portion of the ferrous ions to ferric ions, thereby producing at least a partially regenerated alkaline aqueous ferric iron salt solution. In embodiments, the exposing step comprises producing elemental sulfur.

In embodiments, prior to the contacting step, the alkaline aqueous ferric iron salt solution comprises at least some iron-based particles, and wherein due to at least one of the contacting step (a), the producing step (b) and the exposing (oxidizing) step (c), the regenerated alkaline aqueous ferric iron solution is free of iron-based particles.

In embodiments, the process for removal of reduced sulfur compounds is a continuous process. In embodiments, the contacting step (a), the producing step (b), and the exposing step (c) occur concomitantly, if present. In embodiments, the method comprises repeating steps (a)-(c) at least once.

In embodiments of the method, a flow of fluid is contacted with the alkaline aqueous ferric solution for a selected contact time to remove reduced sulfur compounds from the fluid to provide a purified fluid. In embodiments, after contact with fluid, the alkaline at least partially reduced ferric iron solution contains at least one iron sulfide and thereafter the iron sulfide is oxidized to elemental sulfur and ferric ions in the at least partially reduced alkaline aqueous ferric solution. In embodiments, such removal is continuous. In embodiments, the at least partially reduced alkaline aqueous ferric solution is oxidized to at least in part regenerate the alkaline aqueous ferric solution. Oxidation can be performed by contacting the at least in part reduced ferric iron salt solution with oxidizing agents, such as oxygen in air or another oxygen-containing gas.

In embodiments, the alkaline aqueous ferric iron salt solution comprises ferric ions ($Fe^{3+}$); potassium ions ($K^+$); wherein the molar ratio of the potassium ions to the ferric ions is at least 1.0; carbonate ions ($CO_3^{2-}$); bicarbonate ions ($HCO_3^-$); and optionally nitrate ions. In embodiments the alkaline aqueous iron salt solution comprises ferric-carbonate complexes that are anionic in nature and exhibit unusually high solubility in alkaline solutions. In embodiments, the alkaline aqueous ferric iron salt solution comprises nitrate ions. In embodiments, the alkaline aqueous ferric iron salt solution comprises bicarbonate ions.

In embodiments, the alkaline aqueous ferric iron salt solution contains levels of halide ion of not greater than 10,000 ppm. In embodiments, the alkaline aqueous ferric iron salt solution contains levels of halide ion of not greater than 1,000 ppm. In embodiments, the alkaline aqueous ferric iron salt solution contains levels of halide ion of not greater than 100 ppm. In embodiments, the alkaline aqueous ferric iron salt solution contains levels of halide ion of not greater than 10 ppm. In embodiments, the alkaline aqueous ferric iron salt solution does not contain detectible levels of halide ions. In embodiments, the alkaline aqueous ferric iron salt solution contains levels of chloride ion of not greater than 10,000 ppm. In embodiments, the alkaline aqueous ferric iron salt solution contains levels of chloride ion of not greater than 1,000 ppm. In embodiments, the alkaline aqueous ferric iron salt solution contains levels of chloride ion of not greater than 100 ppm. In embodiments, the alkaline aqueous ferric iron salt solution contains levels of chloride ion of not greater than 10 ppm. In embodiments, the alkaline aqueous ferric iron salt solution does not contain detectible levels of chloride ions.

In embodiments, the alkaline aqueous ferric iron salt solution contains levels of sulfate ion of not greater than 10,000 ppm. In embodiments, the alkaline aqueous ferric iron salt solution contains levels of sulfate ion of not greater than 1,000 ppm. In embodiments, the alkaline aqueous ferric iron salt solution contains levels of sulfate ion of not greater than 100 ppm. In embodiments, the alkaline aqueous ferric iron salt solution contains levels of sulfate ion of not greater than 10 ppm. In embodiments, the alkaline aqueous ferric iron salt solution does not contain detectible levels of sulfate ions. In embodiments, the alkaline aqueous ferric iron salt solution contains levels of sodium ion of not greater than 10,000 ppm. In embodiments, the alkaline aqueous ferric iron salt solution contains levels of sodium ion of not greater than 1,000 ppm. In embodiments, the alkaline aqueous ferric iron salt solution contains levels of sodium ion of not greater than 100 ppm. In embodiments, the alkaline aqueous ferric iron salt solution contains levels of sodium ion of not greater than 10 ppm. In embodiments, the alkaline aqueous ferric iron salt solution does not contain detectible levels of sodium ions. In embodiments, the alkaline aqueous ferric iron salt solution does not contain NaCl. In embodiments, the alkaline aqueous ferric iron salt solution does not contain ethanol. In embodiments, the alkaline aqueous ferric iron salt solution does not contain an alcohol having 1-6 carbon atoms.

In embodiments, the alkaline aqueous ferric iron salt solution comprises one or more organic additives, other than organic solvents. In embodiments, the one or more organic additives are chelating agents. In embodiments, any organic additives, other than organic solvents, are present in the solution at concentrations such that the molar ratio of ferric ion in the solution to each organic additive is at least 2. In embodiments, wherein the solutions comprise one or more organic additives, ferric ions are present in the solution in molar excess, for instance at least 3-, at least 5-, at least 10- or at least 20-fold molar excess, over each of the organic additives. In embodiments, the alkaline aqueous ferric iron salt solution does not contain a chelating agent. In embodiments, the alkaline aqueous ferric iron salt solution does not contain EDTA ions.

In embodiments, the alkaline aqueous ferric iron salt solution is made by dilution of a concentrate. In embodiments, the concentrate is diluted from 1- to up to 60-fold with an aqueous medium, and in particular embodiments, the aqueous medium used for dilution is a potassium carbonate/bicarbonate buffer. In a more specific embodiment, the concentrate is diluted from 10-to 30-fold with an aqueous medium, and particularly with a potassium carbonate/bicarbonate aqueous buffer. An unusual aspect of the alkaline aqueous ferric iron salt is that the concentrate is preferably diluted into potassium carbonate/bicarbonate buffer, rather than water. Dilution into water often results in precipitation of iron oxide particles, whereas dilution into potassium carbonate/bicarbonate buffer results in fully soluble alkaline aqueous ferric iron salt solutions. Aqueous media used to dilute ferric ion salt solutions for use in methods herein can include other ionic or non-ionic components that do not deleteriously affect and may enhance solubility of the ferric ions therein.

a. Methods of Synthesis

Broadly, the present patent application also relates to methods for producing and using alkaline aqueous ferric iron salt solutions. As described in greater detail below, the new alkaline aqueous ferric iron salt solutions may be produced and regenerated onsite via a variety of methods at substantially lower cost and chemical consumption than competing $H_2S$ control technologies.

i. Aqueous Synthesis Methods

Aqueous synthesis methods of producing the new alkaline aqueous ferric iron salt solutions generally include reacting at least one ferric iron salt reagent with at least one alkali metal carbonate salt reagent. In some embodiments, the at least one ferric iron salt reagent comprises ferric nitrate ($Fe(NO_3)_3$). Generally, the at least one alkali metal carbonate salt reagent comprises potassium carbonate, or potassium bicarbonate and combinations thereof. The ferric iron salt reagent may be in any suitable form, such as dissolved in aqueous solution or as a dry or hygroscopic solid. For instance, in embodiments where at least some ferric nitrate is used as a solid, the ferric nitrate may be in the form of the hexahydrate salt, or the nonahydrate salt and combinations thereof. An acidic aqueous solution comprising a ferric salt may be produced, for instance, by solubilizing the ferric iron from scrap metal (e.g., iron or steels) using an acidic solution (e.g., nitric acid to produce a ferric nitrate solution).

Similarly, the potassium carbonate and potassium bicarbonate may be in any suitable form. For instance, potassium carbonate may be used in the form of the anhydrous salt, or the sesquihydrate salt ($K_2CO_3.1.5H_2O$) and combinations thereof. As discussed in greater detail below, while not being bound by any theory, it is believed that at least the carbonate ions complex with and greatly enhance the solubility of the ferric iron in the alkaline aqueous ferric iron solutions. Furthermore, alkaline ferric iron salt solutions comprising nitrate may be preferred since similar mixtures made from different ferric and alkali metal salts may not form alkaline aqueous ferric iron solutions that are free of precipitates (e.g., particles such as ferric iron-based particles) (see Example 1). In embodiments, water-soluble ferric salts can be employed as the ferric iron salt reagent. In specific embodiments, the ferric iron salt reagent is not ferric chloride. In specific embodiments, the ferric iron salt reagent is not ferric sulfate.

As used herein, "alkali metal carbonate salt" means a carbonate salt of one or more of the alkali metals (e.g., Li, Na and K). Thus, for the purposes of this patent application, carbonate salts of the alkaline earth metals (e.g., Ba, Mg, Ca, Sr) do not fall within the scope of the term, "alkali metal carbonate salt."

The term "alkaline aqueous solution" refers to an aqueous solution of pH greater than 7.0. Preferred alkaline aqueous solutions are those having pH greater than 8.0. Alkaline solutions include those having pH between 9-13. The terms aqueous solution and aqueous medium also include miscible mixtures of water with organic solvents, wherein water is the predominant component (at least 50% by volume) of the aqueous medium or solution. In specific embodiments, one or more organic solvents which are water soluble, such as ethanol, are present in the aqueous medium up to 20% by volume. In specific embodiments, one or more water-soluble organic solvents, such as ethanol are present in the aqueous medium up to 10% by volume.

After the reacting step described above, the resulting alkaline aqueous ferric iron salt solutions generally comprise ferric ions ($Fe^{3+}$), potassium ions ($K^+$), carbonate ions ($CO_3^{2-}$) and bicarbonate ions ($HCO_3^-$), optionally with one or more organic additives. As discussed in greater detail below, the molar ratio of the potassium ions to the ferric ions is generally at least 2.0

While not being bound by any theory, it is believed that the ability of the ferric iron to remain highly soluble in alkaline solutions is due to the composition of the novel ferric iron salt, specifically the formation of ferric ion complexes with carbonate, bicarbonate and/or hydroxide or nitrate ions that are anionic in nature. It is further believed that the ability of the ferric iron to remain highly soluble in alkaline solutions is due to the self-assembly of ferric ions with carbonate, bicarbonate and/or hydroxide or nitrate ions to form complexes that are anionic in nature. As such, any suitable aqueous synthesis pathway (e.g., the specific reagents used or the order of combining reagents) may be chosen to produce the alkaline aqueous ferric iron salt solutions. Some suitable methods are described below.

As used herein, an "aqueous solution" includes (1) a solution where the predominating solvent (greater than 50% by volume) is water and (2) water. In the case that water is used, the water may be a purified form of water, such as deionized water or distilled water. As noted above, aqueous medium can be a miscible mixture of water and a water-soluble organic solvent. Such aqueous media are single phase, showing no visible phase separation. The term solution is used herein to distinguish over suspensions comprising particles and more particularly to distinguish solutions comprising ferric ions complexes in aqueous medium from suspensions containing iron-based precipitates. For instance, suspensions of iron oxides such as ferrihydrite, hematite, akaganéite, goethite, lepidocrocite, and magnetite are distinguished from solutions comprising soluble iron ions or soluble, anionic iron-carbonate complexes. In embodiments herein, solutions, even when colored, are generally transparent on visual inspection. In embodiments herein, solutions have no suspended particles on visual inspection. In embodiments herein, solutions after being subjected to centrifugation do not have a solid pellet by visual inspection. In embodiments herein, solutions that are filtered through 0.3 micron filter paper show no visible solid particles on the filter. In embodiments herein, the solution may be a colloid solution as that term is understood in the art. In embodiments herein, the solution is not a colloid solution as that term is understood in the art. In embodiments herein, the solution does not exhibit a Tyndall effect as that effect is understood in the art.

The term solution is used herein as broadly as it is used in the art. In an embodiment, the term solution refers to a solution of a solid, particularly a salt, in water or an aqueous medium. Herein, a solid is soluble in water or an aqueous medium, if 1 or more grams of the solid dissolve in 100 mL of water or the aqueous medium, which may be an alkaline buffer. In embodiments, preferred solids and salts of this invention are very soluble in water or an aqueous medium such that 2 or more grams of the solid or salt dissolve in 100 mL of water or aqueous medium, such as alkaline buffer. Solubility is assessed at ambient room temperature (25° C.) and ambient pressure (1 atmosphere). It will be appreciated that solubility of a given solid in a given solvent can be affected by the presence of other solutes in the water or aqueous medium. In embodiments, certain salts and solids of this invention are soluble in water or aqueous medium such that 0.1 gram or more of salt or solid dissolves in 100 mL of the water or aqueous medium. In embodiments, certain salts and solids of this invention are soluble in water or aqueous medium such that 0.5 gram or more of salt or solid dissolves in 100 mL of the water or aqueous medium. In embodiments, certain salts and solids of this invention are soluble in water or aqueous medium such that 1 gram or more of salt or solid dissolves in 100 mL of the water or aqueous medium. In embodiments, certain salts and solids of this invention are soluble in water or aqueous medium at a level of 5 or more grams/100 mL water or medium. In embodiments, certain salts and solids of this invention are soluble in water or aqueous medium at a level of 50 or more grams/100 mL water or medium.

In one embodiment, reacting the reagents comprises combining a first aqueous solution and a second aqueous solution. In one embodiment, the first aqueous solution comprises the at least one ferric iron salt reagent and the second aqueous solution comprises the at least one alkali metal carbonate salt reagent. The first aqueous solution and/or the second aqueous solution may comprise at least one of the one or more organic additives. Furthermore, at least one of the one or more organic additives may be added to the produced alkaline aqueous ferric iron solution.

As noted above, the required reagents are at least one ferric iron salt and at least one alkali metal carbonate salt. Due in part to the acidic nature of the at least one ferric salt and the basic nature of the alkali metal carbonate salt, the contacting step results in a vigorous, somewhat exothermic reaction that generates carbon dioxide gas. At least some of the generated carbon dioxide is released from the reaction mixture as a gas. In an embodiment, 10% or more of the total $CO_2$ in carbonate is released. In embodiments, up to 20% of the total carbonate in $CO_2$ is released.

As used herein, "organic additives" means any molecule having at least one carbon atom and at least one hydrogen atom. Organic additives include among others include one or more chelating agent. Organic additive reagents may be included in any suitable form. For instance, ethylenediaminetetraacetic acid ("EDTA") may be included in its acidic form (EDTA) or any of its salt forms (e.g., $Na_2EDTA$, $Na_4EDTA$, $K_2EDTA$ and $K_4EDTA$).

In some embodiments, the reacting comprises fully combining the at least one ferric iron salt reagent with the alkali metal carbonate salt reagent to produce the alkaline aqueous ferric iron solution. In an embodiment, ferric iron reagent is converted on reaction to a water-soluble alkaline ferric iron salt. The resulting alkaline aqueous ferric iron salt solutions are preferably free of particles, such as iron-based particles. In embodiments, a step of filtering, settling, or centrifugation can be employed to remove precipitate formed on reaction, so long as the filtered or centrifuged solution is stable to further precipitation of solid or salt from the solution. In embodiments, no step of filtering, settling, or centrifugation is required because a fully soluble solution is formed.

The presence of particles, particularly iron-oxide- or oxyhydroxide-based particles, in the alkaline aqueous ferric iron solution is not preferred for several reasons. For instance, contacting the alkaline aqueous ferric iron solutions with a reduced sulfur-containing fluid and exposing the resulting solution to an oxidizing agent produces elemental sulfur. Elemental sulfur is insoluble in water and in the alkaline aqueous ferric iron solutions of the present invention. Accordingly, the elemental sulfur is generally removed by a simple liquid-solid separation process that results in high recovery of the alkaline aqueous ferric iron solution, thus minimizing loss of the active ferric iron. Conversely, iron-based particles tend to embed themselves in elemental sulfur, thereby resulting in the loss of ferric iron in such liquid-solid separation processes. Thus, the presence of iron-based particles in alkaline aqueous ferric iron solutions is not preferred. Furthermore, while not being bound by any theory, it is believed that the presence of particles (e.g., iron-based particles) may promote (e.g., catalyze) the formation of other, chemically unreactive or less reactive iron-based particles from the alkaline aqueous ferric iron solutions, resulting in the loss of active iron as a reduced sulfur capture agent.

As noted above, the alkaline aqueous ferric iron salt solutions are preferably free of particles (e.g., free of iron-based particles). However, the inventors of the present invention have found that particles may sometimes form after production of more highly concentrated alkaline aqueous iron solutions. For instance, an alkaline aqueous ferric iron solution that is supersaturated with ferric iron may be thermodynamically unstable and precipitate iron-based particles. In some instances, these alkaline aqueous iron solutions are free of any organic additives. However, such iron-based particles may be dissolved into solution with the addition of organic additives at low concentrations (e.g., sub-stoichiometric) as described herein. Alternatively, such particles may be filtered from the solution. Unexpectedly, the inventors of the present invention have found that an alkaline aqueous ferric iron solution comprising at least some particles (e.g., iron-based particles) may be contacted with a reduced sulfur-containing fluid and subsequently exposed to an oxidizing agent, e.g., air or oxygen, thereby producing an alkaline aqueous ferric iron solution that is free of particles.

As used herein, "free of particles" means that an alkaline aqueous ferric iron solution is visually free of any particles. In one embodiment, an alkaline aqueous ferric iron solution is free of iron-based particles. As used herein, "iron-based particles" means any particles (e.g., precipitates) comprising iron that may form during or after production of alkaline aqueous ferric iron salt solutions. For instance, iron-based particles may be iron oxides, iron oxyhydroxides, mixed metal oxides and any combinations thereof. In one embodiment, an alkaline aqueous ferric iron solution is free of iron oxide particles (e.g., ferrihydrite, hematite, akaganeite, goethite, lepidocrocite, and magnetite).

Iron-based particles can be detected in general by any analytical method known in the art. For example, iron-based particles can be detected by filtration of any precipitate from liquid medium followed by analyzing the precipitate using inductively coupled plasma (ICP).

ii. Additional Methods

As noted above, alkaline aqueous ferric iron salt solutions may be produced and subsequently employed for the treatment of fluids comprising reduced sulfur compounds (e.g., $H_2S$). In addition to such syntheses, alkaline ferric iron salt solutions can be produced from intermediate forms, including at least partially reacted solid mixtures and at least partially reacted wet solid mixtures. For instance, such at least partially reacted mixtures may be produced by combining solids of a ferric iron salt reagent and an alkaline carbonate salt reagent, optionally with one or more first organic additives, followed by forceful mixing (e.g., ball milling) to react at least some of the reagents. The term ferric iron salt reagent is used to designate the ferric iron salt that is used to prepare the solutions of the invention and to distinguish that salt reagent from the soluble ferric iron salt that is formed during preparation. This mixing may be done in the absence of added water (note that water can be present in salts and solids, such as is present in the ferric nitrate hexahydrate salt and/or ferric nitrate nonohydrate salt) or with an amount of water or aqueous medium that is insufficient to fully solubilize and react the ferric iron salt and/or alkali metal carbonate reagents. The solution is then prepared by adding water or aqueous medium to fully solubilize the ferric iron salt formed on reaction.

iii. Drying and Rehydration

After their production, the alkaline aqueous ferric iron salt solutions, those that are concentrated, may be diluted for use in treating reduced sulfur-containing fluids. It has been found that diluting alkaline aqueous ferric iron salt can be done by adding a concentrated alkaline aqueous ferric iron solution to an aqueous alkali metal carbonate solution or an aqueous alkali metal carbonate-bicarbonate buffer. In an embodiment, for example, the concentrated alkaline aqueous ferric iron solution is added to an aqueous alkali metal carbonate-bicarbonate buffer (e.g., an aqueous potassium carbonate-bicarbonate buffer) of pH range 8.5-11. Diluting alkaline aqueous ferric iron salt solutions in an aqueous metal carbonate or aqueous metal carbonate-bicarbonate buffer may be preferred as it has been found that substantially diluting alkaline aqueous ferric iron solutions with aqueous solutions at circum-neutral pH (e.g., distilled water, deionized water) may lead to the formation of iron-based particles.

After their production, alkaline aqueous ferric iron salt solutions may be dried to form a solid ferric iron-containing salt mixture that may be rehydrated to form alkaline aqueous ferric iron salt solutions. For instance, the drying may be performed by evaporation or spray drying and combinations thereof, among other methods. After drying, the solid materials may be rehydrated, for instance, using an aqueous solution (e.g., water), an aqueous alkali metal carbonate solution and/or an aqueous alkali metal carbonate-bicarbonate buffer solution (e.g., an aqueous potassium carbonate-bicarbonate buffer solution). The rehydration solution may be added to the solid material or vice-versa. Such solid ferric iron-containing mixtures may advantageously be produced at a centralized processing facility, then subsequently diluted at a location closer to the point of usage.

b. Products and Composition i. Alkaline Aqueous Ferric Iron Solutions

Generally, the resulting alkaline aqueous ferric iron salt solutions of the present invention comprise ferric ions ($Fe^{3+}$), potassium ions ($K^+$), carbonate ions ($CO_3^{2-}$) and bicarbonate ions ($HCO_3^-$). In some embodiments, an alkaline aqueous ferric iron salt solution further comprises at least some hydroxide ion ($OH^-$) or nitrate ion ($NO_3^-$). In some embodiments, an alkaline aqueous ferric iron solution comprises one or more organic additives. In some preferred embodiments, an alkaline aqueous ferric iron salt solution is free of particles. In some embodiments, an alkaline aqueous ferric iron solution is free of ferric iron-based particles.

In embodiments, the alkaline aqueous ferric iron salt solutions have a concentration of ferric iron from 0.005 to 5.0 mols/L. Higher concentration alkaline aqueous ferric iron salt solutions may be produced with precipitated solids (e.g., water-soluble iron-based solids) therein that may dissolve upon the addition of an aqueous solution (e.g., water or an alkaline aqueous buffered solution). The pH of the alkaline aqueous ferric iron solutions may generally be from 8.0 to 13.0. In one embodiment, the pH of an alkaline aqueous ferric iron salt solution is at least 8.0. In another embodiment, the pH of an alkaline aqueous ferric iron salt solution is at least 8.5. In yet another embodiment, the pH of an alkaline aqueous ferric iron salt solution is at least 9.0. In another embodiment, the pH of an alkaline aqueous ferric iron salt solution is at least 9.5. In another embodiment, the pH of an alkaline aqueous ferric iron salt solution is at least 10.0. In yet another embodiment, the pH of an alkaline aqueous ferric iron salt solution is at least 10.5. In another embodiment, the pH of an alkaline aqueous ferric iron salt solution is at least 11.0. In yet another embodiment, the pH of an alkaline aqueous ferric iron salt solution is at least 11.5. In one embodiment, the pH of an alkaline aqueous ferric iron salt solution is not greater than 13.0. In another embodiment, the pH of an alkaline aqueous ferric iron salt solution is not greater than 12.5. In yet another embodiment, the pH of an alkaline aqueous ferric iron salt solution is not greater than 12.0. In another embodiment, the pH of an alkaline aqueous ferric iron salt solution is not greater than 11.5. In yet another embodiment, the pH of an alkaline aqueous ferric iron salt solution is not greater than 11.0.

In embodiments, the alkaline aqueous ferric iron salt solution has a pH of at least 8, or at least 8.5, or at least 9, or at least 9.5, or at least 10, or at least 10.5, or at least 11.0; or between 8 and 13.5; or between 8.5 and 13.5; or between 9 and 13.5 or between 10 and 13.5; or between 10.5 and 13.5; or between 11 and 13.5 or between 9 and 12.5; or between 9.5 and 12; or between 9 and 11; or between 9 and 10; or between 11 and 13.5; or between 11 and 13; or between 11 and 12; or between 12 and 13.5; or between 12 and 13; or 9, or 10 or 11 or 12 or 13.

ii. Solid Products

As noted above, the alkaline aqueous ferric iron solutions may be produced from an intermediate solid material and/or the solid material produced by drying an alkaline aqueous ferric iron salt solution (i.e., a "solid ferric iron-containing material"). Such solid products may have the advantage of decreased storage space and lower shipping costs to the point of use, among others. While not being bound by any theory, it is believed that the ferric iron salt in these materials may be present as a complex ferric metal salt, where the mixed metal salt comprises the ferric iron ions and one or more of potassium ions, carbonate ions, bicarbonate ions, nitrate ions (when present), hydroxide ions, and water. In embodiments, the mixed metal potassium/ferric salt formed on reacting as described herein is soluble in water or aqueous medium. In specific embodiments, the molar ratio of potassium ions to ferric ions in the salt is 3 or more. In embodiments, the salt can be a mixture of one or more of such mixed metal salts. In an embodiment, the salt comprises $K_6[Fe_2(OH)_2(CO_3)_5]$. In specific embodiments, the molar ratio of potassium ions to ferric ions in the alkaline aqueous salt solution is 6 or more, or 6.6 or more, or 7 or more, or 8 or more, or 9 or more, or 10 or more, or 11 or more, or 12 or more.

In embodiments, salts and solids of the invention do not contain nitrate ions at levels greater than 10,000 ppm, or at levels greater than 1,000 ppm, or at levels greater than 100 ppm or at levels greater than 10 ppm or at detectible levels. In embodiments, salts and solid of the invention do not contain chloride ions ($Cl^-$) at levels greater than 10,000 ppm, or at levels greater than 1,000 ppm, or at levels greater than 100 ppm or at levels greater than 10 ppm or at detectible levels. In embodiments, salts and solid of the invention do not contain halide ions (e.g., $Cl^-$, $Fl^-$, $Br^-$) at levels greater than 10,000 ppm, or at levels greater than 1,000 ppm, or at levels greater than 100 ppm or at levels greater than 10 ppm or at detectible levels. In embodiments, salts and solid of the invention do not contain sodium chloride (NaCl) at levels greater than 10,000 ppm, or at levels greater than 1,000 ppm, or at levels greater than 100 ppm or at levels greater than 10 ppm or at detectible levels. In embodiments, salts and solid of the invention do not contain sodium halide at levels greater than 10,000 ppm, or at levels greater than 1,000 ppm, or at levels greater than 100 ppm or at levels greater than 10 ppm or at detectible levels. In embodiments, salts and solid of the invention do not contain sulfate ions at levels greater than 10,000 ppm, or at levels greater than 1,000 ppm, or at levels greater than 100 ppm or at levels greater than 10 ppm or at detectible levels. In embodiments, salts and solids of the invention do not contain sodium ions greater than the amount that is added with the one or more organic additive that may be present, such as $Na_2EDTA$. In embodiments, salts and solids of the invention do not contain sodium ions at levels greater than 10,000 ppm, or at levels greater than 1,000 ppm, or at levels greater than 100 ppm or at levels greater than 10 ppm or at detectible levels.

In addition to using solid ferric iron-containing materials to produce alkaline aqueous ferric iron salt solutions, the solid ferric iron-containing materials themselves may be useful in their solid form to treat reduced sulfur containing fluids. For instance, a solid ferric iron-containing material may be processed into particles (e.g., impregnated into an inert substrate) that may be used as packing in a column for treating reduced sulfur-containing fluids.

iii. Composition

As noted above, the products resulting from the synthesis methods of sections a.i and a.ii generally comprise (and in some instances, consist of, or consist essentially of) ferric iron, potassium, carbonate, bicarbonate, hydroxide, and optionally nitrate, optionally with one or more organic additives. The compositions of such products are described in greater detail below. For the purposes of this section, the term, "products" includes alkaline aqueous ferric iron salt solutions and solid ferric iron-containing materials.

In one embodiment, a product comprises ferric iron (e.g., ferric ions) and one or more organic additives, where a molar ratio of the ferric iron to each of the organic additives is greater than 2.0. In this regard, the molar ratio of the one or more organic additives to the ferric iron may be sub-stoichiometric, meaning that the product comprises more moles of iron than the organic additive. The use of sub-stoichiometric amounts of organic additives relative to iron offers significant cost savings and other benefits. The method herein provides significant cost improvements over existing technologies (e.g., LoCat, Streamline, Eco-Tec) that require utilizing organic additives, such as chelating agents that are present in stoichiometric equivalent amounts, or more frequently in a stoichiometric excess of the ferric iron. In yet another embodiment, the molar ratio is at least 2.0. In another embodiment, the molar ratio is at least 3.0. In yet another embodiment, the molar ratio is at least 4.0. In another embodiment, the molar ratio is at least 5.0. In yet another embodiment, the molar ratio is at least 7.5. In another embodiment, the molar ratio is at least 10. In yet another embodiment, the molar ratio is at least 15. In another embodiment, the molar ratio is at least 50. In one embodiment, the molar ratio is not greater than 1000. In another embodiment, the molar ratio is not greater than 100. Such above-described molar ratios apply individually to any first organic additives, second organic additives, and so on and so forth that are present in the product.

The production of water soluble alkaline ferric iron solutions at pH above 8.0 containing no or sub-stoichiometric ratios of organic additives to ferric iron distinguishes the technology described herein and offers significant cost savings and other advantages relative to competing $H_2S$ control chemistries that use high ratios of organic additives, such as chelating agents, to solubilize iron. Specifically, the alkaline ferric salts produced by these methods are believed to be inherently soluble in water or aqueous medium, and do not require high ratios of expensive chelating agent to solubilize the iron at high pH. In embodiments, alkaline ferric salts produced by these methods are believed to self-assembled into ferric-carbonate complexes that are anionic in nature and that are inherently soluble in water or aqueous medium, and do not require high ratios of expensive chelating agent to solubilize the iron at high pH. It is believed that the majority of ferric ions in the alkaline solutions described herein are not chelated by organic chelating agents, and they are able to freely contact and react with reduced sulfur compounds in a reduced sulfur-containing fluid. The ability to react directly with hydrogen sulfide and form ferrous sulfide provides what is believed to be a novel and much more efficient reaction pathway for capture and oxidation of hydrogen sulfide. This reaction pathway is understood to capture the sulfur atoms from 1.5 hydrogen sulfide molecules for every iron atom. In contrast, competing $H_2S$ control technologies that utilize 1:1 or higher ratios of organic additives to iron ions must rely on indirect electron transfer across the organic chelating agents embedding the iron ions, which is kinetically slower and requires two iron ions to oxidize one $H_2S$ molecule. It is currently believed that the role of the low levels of organic additives used in the technology described herein is to scavenge relatively low levels of free (i.e., non-complexed) ferric ions to prevent them from combining to form iron oxide particles. Because most of the iron ions are at any moment are either complexed with sulfide (as iron sulfide, after $H_2S$ capture) or complexed with carbonate, bicarbonate and potassium as a water-soluble ferric salt (before hydrogen sulfide capture and after oxidative regeneration) there are believed to be few free ferric ions in solution, and hence little chance to form ferric oxide particles. It is believed that trace or low-level amounts of organic additives, as described herein, help scavenge low levels of free ferric ions, further reducing the possibility of iron particle formation.

In one embodiment, a product comprises ferric iron (e.g. ferric ions) and one or more organic additives, where a molar ratio of the ferric iron to the organic additives, in total, is greater than 2.0. In yet another embodiment, the molar ratio is at least 2.5. In another embodiment, the molar ratio is at least 3.0. In yet another embodiment, the molar ratio is at least 4.0. In another embodiment, the molar ratio is at least 5.0. In yet another embodiment, the molar ratio is at least 7.5. In another embodiment, the molar ratio is at least 10. In yet another embodiment, the molar ratio is at least 15. In another embodiment, the molar ratio is at least 50. In one embodiment, the molar ratio is not greater than 1000. In another embodiment, the molar ratio is not greater than 100. Such above-described molar ratios also apply to the sum of all organic additives present in the product.

In embodiments, of products herein, including solutions and solids, the molar ratio of the ferric iron to each of the one or more organic additives is greater than 1, or at least 1.5, or at least 2, or at least 2.5, or at least 3, or at least 4, or at least 5, or at least 7.5, or at least 10, or at least 15, or at least 50; or between 1.1 and 50; or between 1.5 and 50; or between 2 and 50; or between 3 and 50; or between 4 and 50; or between 5 and 50; or between 7.5 and 50; or between 10 and 50; or between 15 and 50; or between 10 and 100; or between 50 and 100.

Suitable organic additives may comprise one or more functional groups, such as one or more hydroxyl groups, one or more carboxylic acid groups and one or amino groups, among others. In one embodiment, an organic additive is a polyol (i.e., an organic additive having at least two hydroxyl groups). In one embodiment, an organic additive is a sugar alcohol (i.e., having a chemical formula $C_nH_{2n+2}O_n$). In one embodiment, an organic additive is a linear sugar alcohol, such as any of the C3-C24 linear sugar alcohols. In one embodiment, an organic additive is a sugar alcohol, where the sugar alcohol is sorbitol (e.g., D-sorbitol, or L-sorbitol and combinations thereof). Other sugar alcohols that may be used include one or more of glycerol, erythritol, threitol, mannitol, galactitol, iditol, arabitol, ribitol, xylitol, volemitol, lactitol, maltotriitol, maltotetraitol, and polyglycitol. Any of the D- or L-isomers of these compounds may be used, as well as mixtures thereof (e.g., racemic mixtures).

Other polyol organic additives that may be suitable include monosaccharides, disaccharides, oligosaccharides and polysaccharides. In one embodiment, an organic additive is a polysaccharide, where the polysaccharide is pectin. Furthermore, extracts of plants, particularly extracts of fruits, leaves or stems of fruits may be used as an organic additive. For instance, an extract of fruit of the genus *Prunus*, or the leaves of the genus *Prunus*, or the stems of the genus *Prunus* and combinations thereof may be used. The extracts of fruits, leaves and/or stems of other plants may similarly be used.

In one embodiment, an organic additive comprises at least one carboxylic acid group. In one embodiment, an organic additive comprises at least one amino group. In one embodiment, an organic additive is an aminopolycarboxylic acid (i.e., having at least one amino group and at least two carboxylic acid groups). In one embodiment, an aminopolycarboxylic acid is ethylenediaminetetraacetic acid ("EDTA"). While not being bound by any theory, it is believed that aminopolycarboxylic acids such as EDTA improve the rate of oxidation of reduced alkaline iron salt solutions.

As noted above, the new alkaline aqueous ferric iron salt solutions may comprise at least some nitrate ions ($NO_3^-$). While not being bound by any theory, it is believed that nitrate anions may increase the solubility of the ferric iron relative to the counter-ions of other commercially available ferric salts (e.g., ferric chloride, ferric sulfate). Furthermore, nitrate ions may have additional benefits, such as being less corrosive than other ions (e.g., halides) to steel, aluminum and other materials that may be exposed to the alkaline aqueous ferric iron salt solutions during commercial operation. In one embodiment, a product comprises a molar ratio of nitrate to ferric iron of at least 1.0. In another embodiment, a product comprises a molar ratio of nitrate to ferric iron of at least 1.2. In yet another embodiment, a product comprises a molar ratio of nitrate to ferric iron of at least 1.5. In another embodiment, a product comprises a molar ratio of nitrate to ferric iron of at least 2.0. In yet another embodiment, a product comprises a molar ratio of nitrate to ferric iron of at least 2.5. In another embodiment, a product comprises a molar ratio of nitrate to ferric iron of at least 3.0.

The alkaline aqueous ferric iron salt solution as a concentrate or in diluted form does not corrode iron or carbon steel.

As noted above, the new alkaline aqueous ferric iron salt solutions generally comprise at least some potassium ($K^+$). While not being bound by any theory, it is believed that potassium cations increase the solubility of the ferric iron-carbonate complex, and may act as counter-ions to the negatively charged ferric iron-carbonate complexes. In one embodiment, a product comprises a molar ratio of potassium to ferric iron of at least 1.0. In another embodiment, a product comprises a molar ratio of potassium to ferric iron of at least 2.0. In yet another embodiment, a molar ratio of potassium to ferric iron of at least 3.0. In another embodiment, a product comprises a molar ratio of potassium to ferric iron of at least 4.0. In yet another embodiment, a molar ratio of potassium to ferric iron of at least 5.0. In another embodiment, a product comprises a molar ratio of potassium to ferric iron of at least 6.0. In yet another embodiment, a product comprises a molar ratio of potassium to ferric iron of at least 7.0. In yet another embodiment, a product comprises a molar ratio of potassium to ferric iron of at least 9.0. In yet another embodiment, a product comprises a molar ratio of potassium to ferric iron of at least 10. In yet another embodiment, a product comprises a molar ratio of potassium to ferric iron of at least 12.

In concentrates of the alkaline ferric iron salt solutions herein the ratio of potassium ion to ferric ion ranges from 6 to 11 and more preferably 6.6 to 12. In a specific embodiment, the ratio of potassium ion to ferric ion in the solution concentrates ranges from 8.5 to 9.5 or from 8.9 to 9.1. In an embodiment, the ratio of potassium ion to ferric ion in the solution concentrates is 9.

In solutions prepared by dilution of solution concentrates, which are working solutions used to scrub reduced sulfur compounds from fluids, in embodiments, the ratio of potassium ion to ferric ion is generally very high largely because concentrates are typically diluted using potassium carbonate/bicarbonate buffers. For example, in diluted working solutions, the ratio of potassium ion to ferric ion can be greater than 20, or greater than 50 or greater than 75, or greater than 100. In specific diluted working solutions, the ratio of potassium ion to ferric ion is 65 or 95.

Unlike other liquid redox technologies used to scrub reduced sulfur compounds from fluids the aqueous alkaline ferric iron salt solutions described herein do not produce any detectable sulfate when oxidized, and do not lose alkalinity during multiple $H_2S$ capture-regeneration cycles. In laboratory tests, samples of the aqueous alkaline ferric iron salt solutions that had undergone repeated $H_2S$ capture/regeneration cycles were neutralized to pH 7 and tested with Quantofix sulfate test strips (Machery-Nagel, Duren, Germany). No evidence of sulfate was observed (<200 mg/L). In addition, repeated $H_2S$ capture regeneration cycles, even in the presence of 40% $CO_2$ gas streams, did not result in gradual loss of alkalinity, as would be expected if sulfate or thiosulfate was produced during sulfide oxidation. During a 7-month pilot project utilizing the same 70 liter batch of the aqueous alkaline ferric iron solution observed pH's never dropped below 8.5. It appears that virtually all captured sulfide is in the aqueous alkaline ferric iron solutions described herein is converted to elemental sulfur, not sulfate or thiosulfate.

The absence of sulfate/thiosulfate production and retention of alkalinity by the aqueous alkaline ferric iron complex described herein are major advantages over competing liquid redox processes for $H_2S$ removal. While not bound by any theory it is believed that the direct reaction of reduced sulfur compounds with the ferric iron-carbonate complex to form iron sulfide immediately removes virtually all captured sulfide ions from the solution, which in turn prevents the formation of sulfate and loss of alkalinity during oxidative regeneration. In LoCat and similar liquid redox technologies sulfide is initially captured by an alkaline buffer, with no direct conversion to iron sulfide. The captured sulfide ions are partially oxidized to sulfate and thiosulfate during regeneration. As a result, the solution gradually loses alkalinity and requires a regular purge stream to remove the accumulated sulfate, as well as regular addition of sodium hydroxide or other bases to retain alkalinity. In embodiments, the aqueous alkaline ferric iron salt solutions described herein, when used to scrub fluids containing reduced sulfur compounds (particularly $H_2S$), do not produce any detectable sulfate when oxidized, and do not lose alkalinity during multiple $H_2S$ capture-regeneration cycles. In embodiments, the level of sulfate produced in the aqueous alkaline ferric iron salt solutions when used in such scrubbing applications is less than 500 mg/L. In embodiments, the level of sulfate produced in the aqueous alkaline ferric iron salt solutions when used in such scrubbing applications is less than 400 mg/L. In embodiments, the level of sulfate produced in the aqueous alkaline ferric iron salt solutions when used in such scrubbing applications is less than 300 mg/L. In embodiments, the level of sulfate produced in the aqueous alkaline ferric iron salt solutions when used in such scrubbing applications is less than 200 mg/L.

c. Methods of Using Alkaline Aqueous Ferric Iron Solutions

As noted above, the alkaline aqueous ferric iron salt solutions of the present invention may be used to treat reduced sulfur-containing fluids. For instance, the new alkaline aqueous ferric iron salt solutions may be used to treat natural gas streams, biogas streams (e.g., from wastewater, landfills, among others), oil, geothermal vent gas and effluents from paper mills, among others. Furthermore, the new alkaline aqueous ferric iron salt solutions may be used to treat the effluent from an amine process where the effluent is predominately comprised of acid gases ($CO_2$ and $H_2S$). The solid ferric iron-containing materials described herein may also be useful for treating these types of reduced sulfur-containing fluids.

With reference now to FIG. 1, an embodiment of a method (100) for treating a reduced sulfur-containing fluid is shown. As shown, the method (100) generally comprises first contacting an alkaline aqueous ferric iron solution with a reduced sulfur-containing fluid (110). The alkaline aqueous ferric iron solution comprises ferric ions ($Fe^{3+}$), potassium ions ($K^+$), carbonate ions ($CO_3^{2-}$) and bicarbonate ions ($HCO_3^-$), optionally with one or more organic additives. The reduced sulfur-containing fluid generally comprises at least some of at least one reduced sulfur compound, such as $H_2S$.

As used herein, "reduced sulfur compound" means any sulfur compound having an oxidation state of −2. For instance, hydrogen sulfide ($H_2S$) is a compound where the oxidation state of the sulfur is −2. Other reduced sulfur compounds include carbonyl sulfide (COS), carbon disulfide ($CS_2$) and mercaptans. Oxidized forms of sulfur that may be produced using the alkaline aqueous ferric iron solutions of the present invention include elemental sulfur, which has an oxidation state of 0.

Concomitantly with the contacting (110), the method generally comprises producing a reduced alkaline iron solution or suspension of reduced iron particles, e.g., ferrous sulfide (FeS) or related iron sulfides (120). The producing step (120) generally comprises oxidizing at least some of the at least one reduced sulfur compounds via the alkaline aqueous ferric iron solution, thereby reducing at least some of the ferric ions to ferrous ions. The oxidation-reduction reaction generally converts reduced sulfur compounds such as $H_2S$ to ferrous sulfide or elemental sulfur, for instance. Furthermore, the producing step (120) generally comprises producing at least some iron sulfide compounds. While not being bound by any theory, the resulting ferrous ions ($Fe^{2+}$) are understood to ultimately react with the reduced sulfur compounds to form ferrous sulfide (e.g., FeS), which is a black precipitate.

Generally, concomitantly to the contacting step (a, 110) and producing step (b, 120), the method (100) comprises discharging a purified fluid containing little or no reduced sulfur compounds. In other words, the purified fluid (outlet fluid) has a substantially lower concentration of reduced sulfur compounds than the reduced sulfur-containing fluid (inlet fluid). For instance, an inlet natural gas stream or inlet biogas gas stream containing $H_2S$ may be discharged as a purified gas stream having a substantially reduced $H_2S$ concentration. In this regard, it has been found in laboratory and pilot tests that the alkaline aqueous ferric iron salt solutions of the present invention can reduce high concentrations of $H_2S$ (e.g., as high as 100,000 ppm) to non-detectable levels. Other "liquid redox" $H_2S$ control technologies that use 1:1 or higher ratios of chelating agents to ferric iron have trouble reducing $H_2S$ to less than 10 ppm in part because the electron transfer process between iron and sulfide is believed to be indirect, through the organic chelating agent. In contrast the current invention is believed to allow immediate and direct reaction between ferric iron and hydrogen sulfide, forming ferrous sulfide.

After or concomitantly with the contacting (110) and producing (120) steps, the method generally comprises exposing the reduced alkaline iron solution or suspension of ferrous sulfide particles to an oxidizing agent (130). Suitable oxidizing agents may include oxygen (e.g., in air) and hydrogen peroxide, among others. The exposing step (130) thereby produces a regenerated alkaline aqueous ferric iron salt solution. Furthermore, this step generally comprises producing at least some elemental sulfur (e.g., from the ferrous sulfide formed in the producing step (120)). Thus, the regenerated alkaline aqueous ferric iron solution is generally a mixture of solid elemental sulfur and the alkaline aqueous ferric iron solution. The contacting (110), producing (120) and exposing (130) steps may be repeated at least one time. Due to the reduced alkaline aqueous ferric iron solution's ability to be regenerated back into an alkaline aqueous ferric iron salt solution, it has been found that these steps may be repeated indefinitely.

In addition, elemental sulfur can periodically or continuously be separated (140) from the regenerated alkaline iron solution.

Unexpectedly, the inventors have found that performing the contacting (110), producing (120) and exposing steps (130) on an alkaline aqueous ferric iron solution that comprises at least some iron oxide-based particles may be beneficial for reducing the concentration of such iron-based particles. For instance, it has been found that the iron-based particles may be reduced or eliminated completely via these steps (110, 120 and 130). Thus, in one embodiment, prior to the contacting step (110), an alkaline aqueous ferric iron solution comprises at least some iron-based particles, and due to the contacting step (110), producing step (120) and the exposing step (130), the regenerated alkaline aqueous ferric iron solution has a reduced concentration of iron-based particles (e.g., free of iron-based particles). It is believed that hydrogen sulfide may attack the iron oxide particles and upon oxidation they revert to the soluble aqueous alkaline ferric iron salt.

In some embodiments, the contacting step (110), producing step (120) and exposing step (130) occur concomitantly. For instance, a scrubbing column utilizing an alkaline aqueous ferric iron salt solution may be contacted with a reduced sulfur-containing fluid and exposed to an oxidizing agent concomitantly. An example of where this might be useful is for odor control (e.g., in the production of paper or municipal wastewater treatment). Odiferous fluids containing reduced sulfur compounds such as $H_2S$ that are not present in a concentration sufficient to be a combustion hazard may be combined with an oxidizing fluid such as air. The resulting gas mixture may be passed through a scrubbing column. A similar process may be used in the treatment of an acid gas effluent from an amine process, which may be low in combustible hydrocarbons. These examples differ from natural gas stream or biogas stream where there is a safety concern of adding an oxidant (e.g., $O_2$) to a combustible fluid (e.g., methane).

As noted above, elemental sulfur is produced via the method (100). Thus, the method (100) generally produces a solid-liquid mixture, where the liquid component is an alkaline aqueous ferric iron salt solution, and the solid component comprises (or consists essentially of) elemental sulfur. Thus, the solid elemental sulfur may be separated from the alkaline aqueous ferric iron solutions via any suitable solid-liquid separation technique. For instance, the solid elemental sulfur may be readily separated from the regenerated alkaline aqueous ferric iron solution by passing the solid-liquid mixture through a barrier that is at least partially impenetrable by the elemental sulfur, such as a sieve and/or filter. Additional separations may be employed to further purify the elemental sulfur and/or recover the alkaline aqueous ferric iron solution. For instance, the sulfur-rich solid-liquid mixture may be heated under pressure to form elemental sulfur, which readily separates from the alkaline aqueous ferric iron salt solution. Furthermore, the sulfur-rich solid-liquid mixture may be separated via froth flotation.

Figure 2:
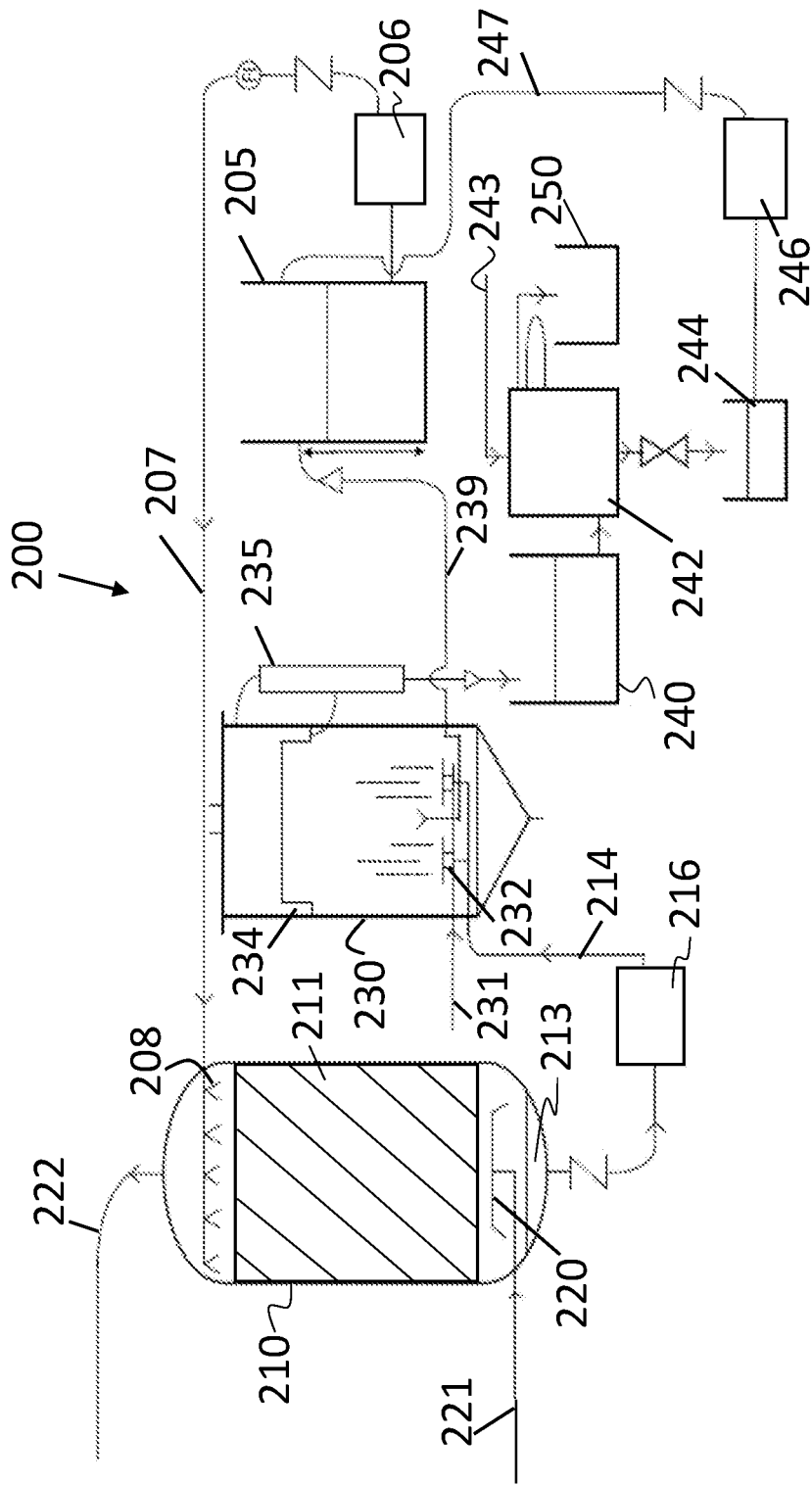
FIG. 2 is a schematic drawing of an exemplary system for treating a reduced-sulfur containing fluid with an alkaline ferric iron salt solution of this invention and regenerating the alkaline ferric iron salt solution after use.

With reference to FIG. 2, an exemplary system (200) of the invention for removing a reduced sulfur compound, such as $H_2S$, from a reduced sulfur compound-containing fluid is schematically illustrated. A reservoir also termed a primary accumulator (205) is provided for holding the alkaline aqueous ferric iron solution (scrubber solution). It is also to this primary accumulator (205) that regenerated scrubber solution is returned after regeneration.

Scrubber solution is pumped, e.g., via centrifugal or displacement pump (206), to scrubber column (210, also termed a contactor) through fill conduit (207). Scrubber solution is introduced to the scrubber column (210), for example, through a plurality of sprayers (208). The scrubber column (210) is optionally provided with filler (211), preferably a high-surface area filler, (e.g., column packing, such as random column packing) to enhance contact between the fluid to be scrubbed and the scrubber solution. In an embodiment, scrubber solution cascades downward, via gravity, through the filler (211). The fluid to be scrubbed, illustrated as a gas containing reduced sulfur compound, such as biogas, is introduced into the scrubber column via inlet conduit (221) though a gas inlet (220) which facilitates dispersal of the reduced sulfur-containing gas into the scrubber column in contact with scrubber solution. Scrubbed gas from which reduced sulfur compound(s) have been removed exits the scrubber column (210) via gas outlet conduit (222). The flow rate of reduced sulfur-containing gas and scrubber solution into the scrubber column is adjusted to decrease the reduced sulfur compound level(s) in the gas to a desired level. In an embodiment, at least 98% (v/v) of the reduced sulfur compound can be removed from the reduced sulfur-containing fluid. In an embodiment, at least 98% (v/v) of $H_2S$ present can be removed from the reduced sulfur-containing fluid. In an embodiment, at least 99% (v/v) of $H_2S$ present can be removed from the reduced sulfur-containing fluid. In multiple laboratory and pilot tests $H_2S$ removal was greater than 99.9%

Ferric iron in the scrubber solution is at least partially reduced to ferrous iron on contact with the reduced sulfur-containing fluid. In addition, after contact with the reduced sulfur-containing fluid, the at least partially reduced scrubber solution contains sulfur, particularly in the form of iron sulfide and more particularly as FeS. The at least partially reduced scrubber solution may also contain precipitated elemental sulfur. At least partially reduced scrubber solution including iron sulfide and any precipitated elemental sulfur is pumped from the sump region (213) of the scrubber column (210) through sump conduit (214) to regeneration tank (230) via sump pump (216, e.g., a centrifugal pump). Ferrous iron is oxidized to ferric iron and elemental sulfur is formed in the regeneration tank (230). The regeneration tank is provided with an air inlet (231) to provide oxygen for regeneration of the at least partially reduced scrubber solution to form elemental sulfur. Air is optionally dispersed into the at least partially reduced scrubber solution via one or more dispersers (232, e.g., gas spargers).

Elemental sulfur formed on regeneration (i.e., via the oxidation by air) floats to the top of the liquid in the regeneration tank (230) and spills into weir (234) provided for collection of elemental sulfur and a portion of the regenerated scrubber solution (elemental sulfur-rich regenerated scrubber solution). Regenerated scrubber solution without elemental sulfur is collected from the regeneration tank via collection conduit (239), for example by gravity flow, and returned to the primary accumulator (205). Sulfur-rich regenerated scrubber solution may be passed through a bubble trap (235) to remove entrained gas and is collected in the sulfur-rich accumulator (240). Collected sulfur-rich regenerated scrubber solution is passed to sulfur filter (242) where elemental sulfur is separated from regenerated scrubber solution and is washed via wash water feed (243). The separated regenerated scrubber solution is collected in accumulator (244) and pumped through return conduit (247) via return pump (246) to primary accumulator (205). Separated sulfur that has been substantially dried is passed to the dry sulfur accumulator (250).

The system as illustrated is typically operated continuously with a selected flow of scrubber solution and reduced sulfur-containing fluid into the scrubber column (210) to achieve the desired level of reduced sulfur removal. At least partially reduced scrubber solution is continuously conveyed to the regenerator tank and regenerated scrubber solution is returned to the primary accumulation tank. In the illustrated system, sulfur filtration is performed periodically in a batch-wise mode when a preselected amount of elemental sulfur has accumulated. The illustrated scrubber column (210) is one example of a number of known means for contacting a scrubber solution with a fluid. For instance, other means for contacting a scrubber solution with a reduced sulfur-containing fluid include fluid filled contactors (i.e., absent filler (211)), static mixers and Venturi systems. One of ordinary skill in the art can readily choose an appropriate known contactor configuration for a given application for removal of reduced sulfur from a given fluid.

d. Miscellaneous

As noted above, the alkaline aqueous ferric iron salt solutions of the present invention exhibit important advantages over the prior art. For instance, the alkaline aqueous ferric iron salt solutions may be produced via various methods that reduce costs, and alkaline aqueous ferric iron solutions may be used in an $H_2S$ capture-oxidative regeneration cycle to treat reduced sulfur-containing fluids. An additional advantage is that the alkaline aqueous ferric iron solutions may be at least partially frozen and then thawed without negatively impacting the ability of the solution to treat reduced sulfur-containing fluids. Although crystallization of the solution may occur at low temperatures (e.g., 1-5° C.), upon heating to room temperature the crystals dissolve, reconstituting the active alkaline aqueous ferric iron salt solutions. Thus, alkaline aqueous ferric iron salt solutions may be stored from minus 20° C. to 55° C. without the need for temperature regulation. This differs from technologies that utilize particles suspended in a solution (e.g., iron oxide slurries) that may not recover their ability to treat reduced sulfur-containing fluids after heating or a single freeze-thaw cycle.

When a Markush group or other grouping is used herein, all individual members of the group and all combinations and sub-combinations possible of the group are intended to be individually included in the disclosure. Every formulation or combination of components described or exemplified can be used to practice the invention, unless otherwise stated. Specific names of compounds are intended to be exemplary, as it is known that one of ordinary skill in the art can name the same compounds differently.

One of ordinary skill in the art will appreciate that methods, including preparation methods and analytical methods, materials and device and system elements other than those specifically exemplified can be employed in the practice of the invention without resort to undue experimentation. All art-known functional equivalents of any such methods or materials are intended to be included in this invention.

Whenever a range is given in the specification, for example, a composition range, a range of process conditions, a range of pressures or temperatures or the like, all intermediate ranges and sub-ranges, as well as all individual values included in the ranges given are intended to be included in the disclosure. All ranges listed in the disclosure are inclusive of the range endpoints listed.

The invention illustratively described herein suitably may be practiced in the absence of any element or elements, limitation or limitations that is not specifically disclosed herein.

Without wishing to be bound by any particular theory, there can be discussion herein of beliefs or understandings of underlying principles or mechanisms of action relating to the invention. It is recognized that regardless of the ultimate correctness of any mechanistic explanation or hypothesis, an embodiment of the invention can nonetheless be operative and useful.

All references throughout this application, for example patent documents including issued or granted patents or equivalents; patent application publications; and non-patent literature documents or other source material; are hereby incorporated by reference herein in their entireties, as though individually incorporated by reference.

Sengupta AK and Nandi AK (1974) "Complex Carbonates of Iron (III) Z, anorg. Allg. Chem., 403, 327-336 and references cited therein are each incorporated by reference herein in its entirety for description of complex carbonate salts of Fe(III) and certain water-soluble salts of Fe(III). The reference also includes descriptions of the synthesis of the salt $K_6[Fe_2(OH)_2(CO_3)_5] \cdot H_2O$ and methods of identifying and characterizing such salts, by U.V./visible spectroscopy and Infrared spectroscopy, among others. The reference includes visible spectra (Figure. 1, therein) of 1.198 mg $Fe^{3+}$ in $KHCO_3$ solution (35%) which exhibits a maximum absorbance at 460 nm. The description of such methods and the characterization of salts is incorporated by reference herein.

All patents and publications mentioned in the specification are indicative of the levels of skill of those skilled in the art to which the invention pertains. References cited herein are incorporated by reference herein in their entirety to indicate the state of the art, in some cases as of their filing date, and it is intended that this information can be employed herein, if needed, to exclude (for example, to disclaim) specific embodiments that are in the prior art. The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention.

THE EXAMPLES

Example 1

A panel of experiments was performed using a variety of ferric salts and alkali metal bases. Pairwise combinations of (1) dry powders of the ferric salts ($FeCl_3$, $Fe_2(SO_4)_3 \cdot XH_2O$ and $Fe(NO_3)_3 \cdot 9H_2O$) and (2) the alkali metal bases (NaOH, KOH, $Na_2CO_3$, $K_2CO_3$, $NaHCO_3$, and $KHCO_3$) were placed in test tubes. The alkali metal bases were added in a ratio of 6.8 to 1 with respect to the moles of alkali metal to the moles of iron. Approximately 5 mL of water was added to each test tube and each test tube was shaken to completely mix the water with the ferric salt and alkali metal base. In the case of alkali metal carbonates, a vigorous reaction with $CO_2$ production occurred. The resulting mixture for each experiment was then visually observed for presence of particles (e.g., iron oxide particles). The results of the panel of experiments are summarized in Table 1, below. A designation of "PPT" indicates that precipitates were observed in the resulting mixture.

TABLE 1

| Chemicals used and the level of their purity. | Base | | | | | | |
| --- | --- | --- | --- | --- | --- | --- | --- |
| | NaOH | KOH | $Na_2CO_3$ | $K_2CO_3$ | $NaHCO_3$ | $KHCO_3$ | $K_2CO_3$ + $KHCO_3$* |
| $FeCl_3$ (anhydrous) | PPT | PPT | PPT | PPT | PPT | PPT | PPT |
| $Fe_2(SO_4)3 \cdot 9H_2O$ | PPT | PPT | PPT | PPT | PPT | PPT | PPT |
| $Fe(NO_3)3 \cdot 9H_2O$ | PPT | PPT | PPT | Soluble | PPT | PPT | PPT |

*Approximately 2 moles of bicarbonate salts were used for each mole of carbonate salts, to maintain comparable alkali metal concentrations.

As shown above in Table 1, the only combination that resulted in a fully soluble mixture upon initial mixing was the $Fe(NO_3)_3 \cdot 9H_2O$ and $K_2CO_3$ pair.

Example 2

An alkaline aqueous ferric iron salt solution was manufactured by first preparing a solid mixture having 213.7 g of ferric nitrate nonahydrate ($Fe(NO_3)_3 \cdot 9H_2O$), 250 g of anhydrous potassium carbonate ($K_2CO_3$) and 9.62 g of D-sorbitol. The solid mixture was placed in a beaker with a magnetic stir bar on a magnetic stir plate. While stirring, 793 mL of an aqueous solution having 19.7 g of the disodium salt of EDTA was added to the beaker. The addition of the water resulted in a vigorous reaction that released $CO_2$ gas. The alkaline aqueous ferric iron salt solution was diluted using an aqueous potassium carbonate-bicarbonate buffer at a ratio of 1:25 alkaline aqueous ferric iron salt solution to aqueous potassium carbonate-bicarbonate buffer by adding the alkaline aqueous ferric iron solution into the aqueous potassium carbonate/bicarbonate buffers. The exemplary buffer solution used to dilute the concentrated ferric iron solutions was a 50:50 (vol:vol) mixture of 0.9 M aqueous $K_2CO_3$ and 1.8 M $KHCO_3$ at pH 10.1. Useful ferric iron solutions can be prepared by dilution of the concentrated solution with potassium carbonate-bicarbonate buffer. Useful ferric iron solutions can be prepared by dilution of the concentrated solution with potassium carbonate-bicarbonate buffer where the dilution is 1:1 (vol/vol) up to 1:60 (vol:vol) concentrate: buffer.

Concentrate of the alkaline aqueous ferric iron solutions is stable for at least one year for use in preparation of working solutions by appropriate dilution (e.g., a 1:20 dillution with buffer)

Afterwards, the diluted alkaline aqueous ferric iron solution was used to scrub hydrogen sulfide from a hydrogen sulfide containing gas. After capturing the hydrogen sulfide gas, the alkaline aqueous ferric iron solution was regenerated by sparging room temperature air through the solution, thereby producing solid sulfur and regenerating the ferric iron salt solution. Solid sulfur was removed from the mixture by passing the sulfur-alkaline aqueous ferric iron solution over a 25-micrometer screen. The capture-regeneration cycle was repeated numerous times, resulting in an average of over 100 hydrogen sulfide molecules being captured and oxidized for every iron atom in the original mixture with no apparent loss of $H_2S$ capture or regeneration activity over the course of the experiment.

Example 3

Preferred Mole Ratios of Potassium and Ferric Iron and Organic Additives in Concentrated and Dilute Working Solutions Various mole ratios of potassium, sorbitol, EDTA and ferric iron were tested to determine short and long term solubility of concentrated aqueous alkaline iron solutions, with the goal of determining preferred mole ratios that maintain high solubility. In these experiments dry solids of all chemicals were mixed and deionized water (10 mL) was added to the mixed solids. All test samples contained 1.3465 g of $Fe(NO_3)_3 \cdot 9H_2O$, which resulted in a final molarity of 0.278 M $Fe(NO_3)_3$. Potassium carbonate, D-sorbitol and Nae-EDTA were added as needed to achieve the mole ratios listed in the Table 2. Upon addition of water to the dry solids a vigorous reaction occurred and either a clear, dark, fully soluble solution or a solution with precipitate of iron oxide particles resulted.

The results of these tests are listed in Table 2. In the absence of sorbitol and EDTA (samples 1-4 in Table 2 below) fully soluble aqueous alkaline ferric iron solutions occurred at K:Fe mole ratios of 9:1 and 12:1, but substantial precipitation of iron oxide particles occurred at lower K:Fe mole ratios (4:1 and 6.6:1). The 9:1 and 12:1 K:Fe solutions remained clear and soluble for 4-5 days but then precipitated after one week. However 1:20 dilutions of the 9:1 and 12:1 K:Fe concentrates with a potassium carbonate-bicarbonate buffer (0.9M $KHCO_3$:0.45M $K_2CO_3$) remained fully soluble. The K:Fe mole ratios of these dilute solutions are much higher, 138:1 and 141:1 for the diluted 9:1 and 12:1 concentrates, respectively. These results demonstrate that at K:Fe mole ratios >8 the aqueous alkaline ferric iron solutions described herein are inherently highly soluble even in the absence of organic additives. This is a highly unusual result for ferric iron compounds, which are normally virtually insoluble at pH's above 5-6.

In the presence of D-sorbitol and EDTA at 1:10 mole ratios relative to ferric iron (samples 5-8) somewhat different results occurred. The 6.6:1, 9:1 and 12:1 K:Fe concentrated solutions were fully water soluble and remained so for at least 7 days, while the 4:1 K:Fe test precipitated immediately. 1:20 dilutions of these soluble concentrates into the same potassium carbonate-bicarbonate buffer described above remained fully soluble as well. It should be noted that the dilute solutions with high K:Fe ratios described herein are the "working solutions" of aqueous, alkaline ferric salts that are used to scrub hydrogen sulfide and other reduced sulfur compounds from gas streams. Exemplary working solutions are made by diluting concentrates such as those listed in Table 2 with potassium carbonate-bicarbonate buffer (0.9M $KHCO_3$:0.45M $K_2CO_3$) at 1:10, 1:20 or 1:30 dilution ratios.

addition of deionized water, and then the acetone-water extraction was repeated. The final volume of purified aqueous alkaline ferric iron salt solution was made up to its original volume by addition of deionized water and the purified ferric iron salt sample and the acetone-water extractions were analyzed for total iron, potassium, sodium, nitrate, and carbonate/bicarbonate. A sample of a concentrate of the aqueous alkaline ferric salt solution was also analyzed.

The concentrate of the alkaline ferric iron solution which was purified had the following composition:
Iron: 32,600 mg/L/0.58 M
Potassium: 133,000 mg/L/3.41 M
Sodium: 4,050 mg/L/0.176 M
Nitrate: 14,700 mg/L/0.245 M
Carbonate: 7.4 mg/L
Bicarbonate: 104,000 mg/L After one 10x acetone-water extraction of the concentrate solution above, the slightly purified ferric iron solution contained:
Iron: 28,400 mg/L/0.507 M
Potassium: 55,300 mg/L/1.42 M
Sodium: 2,720 mg/L/0.118 M
Nitrate: 2,520 mg/L/0.042 M
Carbonate: 4.4 mg/L
Bicarbonate: 67,200 mg/L The potassium to ferric iron mole ratio in the once-purified ferric complex is 2.8 to 1, suggesting a $K_3Fe$-carbonate complex, or a $K_6Fe_2$-carbonate complex. The bicarbonate to ferric iron mole ratio is 2.17, although this value is likely low due to limitations of the bicarbonate analysis.

TABLE 2

| Sample | K:Fe Mole ratio | Sorbitol:Fe Mole ratio | EDTA:Fe Mole ratio | Solution after mixing | Solution after 1 day | Solution after 1 week |
|---|---|---|---|---|---|---|
| 1 | 4:1 | 0 | 0 | PPT | PPT | PPT |
| 2 | 6.6:1 | 0 | 0 | PPT | PPT | PPT |
| 3 | 9:1 | 0 | 0 | Fully soluble, dark brown | Fully soluble, dark brown | PPT |
| 4 | 12:1 | 0 | 0 | Fully soluble, dark brown | Fully soluble, dark brown | PPT |
| 5 | 4:1 | 1:10 | 1:10 | PPT | PPT | PPT |
| 6 | 6.6:1 | 1:10 | 1:10 | Fully soluble, dark brown | Fully soluble, dark brown | Fully soluble, dark brown |
| 7 | 9:1 | 1:10 | 1:10 | Fully soluble, dark brown | Fully soluble, dark brown | Fully soluble, dark brown |
| 8 | 12:1 | 1:10 | 1:10 | Fully soluble, dark brown | Fully soluble, dark brown | Fully soluble, dark brown |

Example 4

Purification of Mixed Metal Salts from Aqueous Alkaline Ferric Salt Solutions.

Using an 80:20 acetone-water mixture as an extractant, we concentrated and purified various mixed metal salts from concentrated aqueous alkaline ferric salt solutions. In general, a given volume of concentrated aqueous alkaline ferric salt solution was sequentially extracted with a 10x volume of 80:20 acetone-water. With each extraction, a reduced volume of viscous, darkly colored, fully water-soluble ferric iron solution was formed below the acetone-water layer. The acetone-water layer was then removed, the separated layer of ferric iron solution was made up to its original volume by After three sequential 10x acetone-water extractions the purified ferric iron solution contained:
Iron: 23,200 mg/L/0.414 M
Potassium: 38,700 mg/L/0.992 M
Nitrate: Not detected The potassium to ferric iron mole ratio is 2.4 to 1. This is still suggestive of $K_3Fe$ or $K_6Fe_2$ mixed metal carbonate complexes, but less so than the previous result. It is possible that the complexes are $K_2Fe$ or $K_4Fe_2$ or $K_5Fe_2$ mixed metal carbonate complexes.

The disappearance of nitrate after three sequential extractions suggests that nitrate is not part of the mixed metal ferric iron complex(es). The nitrate has apparently been removed in the extractions. Carbonate and bicarbonate were not tested in this analysis but are clearly shown to be present by reaction of the purified solution with 8M hydrochloric acid which results in significant bubbling, indicating release of $CO_2$.

These results indicate that potassium, ferric iron and bicarbonate are part of the purified compound. There is approximately three times as much potassium as ferric iron in the purified complex. There is at least twice as much bicarbonate as ferric iron in the complex. Nitrate does not appear to be present. A small amount of sodium is present, but it cannot be determined if sodium is present in the complex. We note that there may be more than one complex in the purified material.

Example 5

An alkaline aqueous ferric iron salt solution was prepared using 1.3465 g of ferric nitrate nonahydrate, 1.5755 g of potassium carbonate, 0.0605 g of D-sorbitol, and 0.124 g of Nae-EDTA. The molar ratios of the organic additives (D-sorbitol and $Na_2EDTA$) were each 1:10 relative to ferric iron. After the production of the alkaline aqueous ferric iron salt solution, a purified ferric iron salt solution was obtained in a manner consistent to Example 4 using an acetone-water mixture (80-20 (v/v) solution). Two serial extraction steps were performed on the alkaline aqueous ferric iron salt solution. Purities and sources of the materials used in this procedure are provided in Table 3.

TABLE 3

| Material | Source | Purity |
| --- | --- | --- |
| Ferric nitrate nonahydrate | Carolina Biological | High purity reagent grade |
| Potassium carbonate | Carolina Biological | Reagent grade |
| D-Sorbitol | Sigma-Aldrich | >=98 wt. % |
| Disodium salt, EDTA | Carolina Biological | Reagent grade |
| Potassium bicarbonate | Carolina Biological | Reagent grade |
| Dowex 21K chloride anion exchange resin | Sigma-Aldrich | N/A |
| Amberlite IR120 sodium cation exchange resin | Sigma-Aldrich | N/A |
| Acetone | Carolina Biological | 99.5 wt. % |

Four glass sample vials (two experimental vials and two control vials) were packed with ¼-inch beds of ion exchange resin. Two of the vials were packed with Dowex 21K (Cl⁻) anion exchange resin and the other two vials were packed with Amberlite IR120 ($Na^+$) cation exchange resin.

After packing the vials with the ion exchange resins, the experimental vials were prepared as follows. One vial of cation exchange resin and one vial of anion exchange resin were charged with 3 mL of 1.8 M potassium bicarbonate buffer solution. After approximately 5 minutes, the excess fluid was decanted from the ion exchange resin beads. The ion exchange resin beads were then rinsed with distilled water to remove excess buffer solution and suspended in 0.45M potassium bicarbonate buffer. After suspending in buffer, the excess buffer was decanted off and 200 microliters of the purified ferric iron salt solution was added to each of the experimental vials. The experimental vials were then decanted approximately 2 minutes later to remove the excess liquid from the vials. After decanting, a 0.45 M potassium bicarbonate buffer solution was added to the experimental vials to thoroughly rinse the ion exchange resins to remove any unbound ferric iron salt.

After packing the vials with the ion exchange resins, the control vials were prepared as follows. One of each cation exchange resin and anion exchange resin was suspended in distilled water. The control vials were then decanted approximately 2 minutes later to remove the excess liquid from the vials. After decanting, a 0.45 M potassium bicarbonate buffer solution was added to the control vials to thoroughly rinse the ion exchange resins.

After washing both the experimental vials and control vials with the 0.45 M buffer solution, the experimental cation exchange resin was identical in color (bronze) to the control sample of the cation exchange resin. Conversely, the anion exchange resin treated with the purified mixed metal ferric salt was a deep amber color, similar in color to the purified alkaline ferric iron salt solution. Furthermore, the control anion exchange resin sample had a light brown color. The significantly darker color of the anion exchange resin compared to control anion exchange resin indicates binding of negatively charged (anionic) ferric species from the isolated ferric iron salt solution. In contrast, the lack of a significant difference in color between treated and control cation exchange resin, respectively, indicates no significant binding of cationic ferric species.

It is assumed with high confidence that the ferric iron complex, whether anionic or cationic in nature, is responsible for the dark amber color found in solutions described herein. Thus, since no color change was observed with the experimental cation exchange resin relative to the control, it is believed that the ferric iron complex of the solutions described herein is not cationic in nature. In contrast, the color change of the anion exchange resin to a dark amber color demonstrates that the ferric ion complex of the solutions described herein is negatively charged, i.e., the ferric complex is an anion. This anionic ferric iron complex is believed to be critical to the unusual solubility of the ferric iron at high pH (>8) and its direct reactivity with reduced sulfur compounds (e.g., $H_2S$) in reduced sulfur-containing fluids. Conversely, positively charged ferric ions are virtually insoluble at pH greater than 6.

In sum, the ability to create and use thermodynamically stable, fully aqueous soluble, negatively charged ferric iron complexes may create a wide range of potential industrial applications in addition to this patent application's focus on the treatment of reduced sulfur-containing fluids.

Example 6

Figure 3:
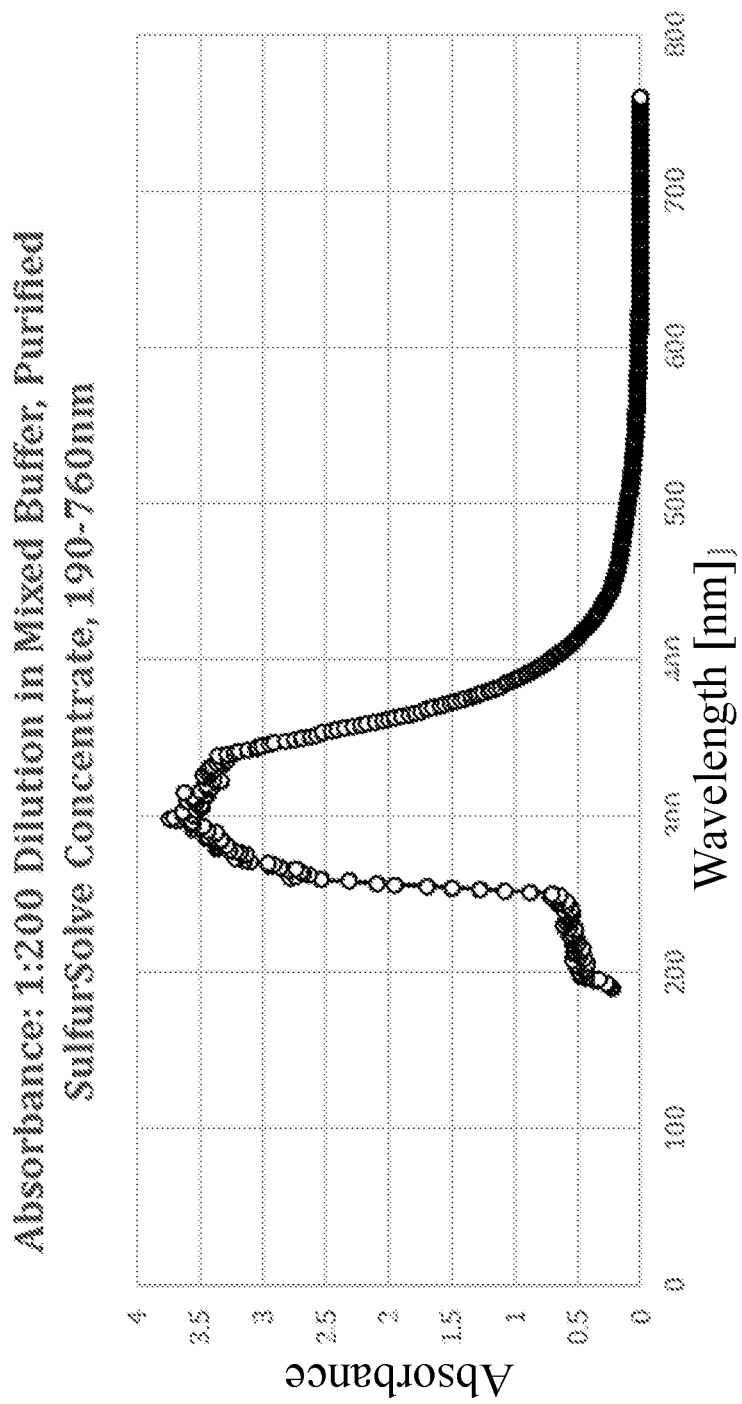
FIG. 3 is a UV-Vis spectrum of purified alkaline ferric iron salt solution diluted in buffer as described in Example 6.

A Thermo Scientific UV-VIS spectrophotometer was used to obtain a UV-Vis spectrum of a sample of purified aqueous alkaline ferric iron salt solution. The sample used in the analysis was prepared by first producing a concentrated aqueous alkaline ferric iron salt solution from 1.3465 g of ferric nitrate nonahydrate, 1.5755 g of potassium carbonate, 0.0605 g of D-Sorbitol, and 0.124 g of Nae-EDTA. The mole ratios of D-sorbitol and EDTA relative to ferric iron are each 1:10. From this concentrate, the purified ferric iron salt solution was purified by extraction in a manner consistent with Example 4. Two serial extractions were performed using a 1:10 ratio of concentrated aqueous alkaline ferric iron salt solution to an 80:20 (v/v) acetone-water mixture. The purified ferric iron salt solution was then diluted in a ratio of 1:200 (v/v) purified ferric iron solution to buffer solution. The buffer used for this dilution was prepared using equal volumes of 1.8 M potassium bicarbonate and 0.9 M potassium carbonate. After dilution, 3.5 mL of the diluted ferric iron salt solution was placed in a clean cuvette, then analyzed in the spectrophotometer. The spectrum of the diluted ferric iron salt solution was taken from 190 nm to 1100 nm. The spectrum of the diluted ferric iron salt solution can be seen in FIG. 3. As shown in the figure, there is a strong peak having a λ maximum of about 298 nm, centered at approximately 325 nm, extending from approximately 250 nm to 500 nm. The strong peak decreases in absorbance from the peak at 298 nanometers, tailing off into the visible part of the spectrum, eventually reaching approximately 0 absorbance at about 550 nm. This blue-violet absorbance in the near UV range explains the intense amber color of the suspected compound(s) in the purified aqueous alkaline ferric iron salt solution.

Example 7

Pilot test of aqueous alkaline ferric iron solutions on biogas containing high hydrogen sulfide levels.

A 70 liter volume of the alkaline aqueous ferric iron solution was used to treat biogas containing ~16,000 ppm hydrogen sulfide at a pulp and paper mill. The same 70 liter solution had previously been used 4-5 days per week for 7 months at a wastewater plant to scrub biogas containing 150-450 ppm $H_2S$ and had been regenerated repeatedly by oxidation with air. The pilot system was arranged as depicted in FIG. 2, with the exception that the sulfur filtration system was not included in this pilot.

Six scfm of warm, humid biogas entered the base of the scrubber column via a 2 inch PVC pipe and rose through a layer of plastic (polypropylene) packing, exiting the column via a 2 inch PVC pipe. Regenerated solution was pumped by an 8 liter per minute positive displacement pump to the top of the scrubber column, where a shower head type sprayer distributed the alkaline ferric iron solution evenly on the top of the packing. The solution trickled down through the packing, in close contact with the rising stream of biogas. Hydrogen sulfide in the biogas was absorbed into the solution and is believed to be quickly converted to ferrous sulfide (FeS) or ferric sulfide ($Fe_2S_3$). At the bottom of the column, the partially reduced solution accumulated into a shallow sump, where it was continuously pumped by an identical 8 liter-per-minute positive displacement pump to the base of a 1 ft diameter×30-inch tall regeneration column. Approximately 3 scfm of air was pumped through a sparger into the regeneration column, regenerating the reduced alkaline iron solution to its active ferric form and simultaneously oxidizing the captured sulfide to elemental sulfur. The regenerated solution was then pumped to a primary accumulator and then to the top of the scrubber column, completing the $H_2S$ capture-regeneration cycle.

Due to the high $H_2S$ levels present, colorimetric Draeger tubes were used to measure $H_2S$ in untreated gas. High range Draeger Glass Detector tubes (Model #CH28101) detect $H_2S$ in the range 0.2 to 7% Vol. Measuring Range Mfr. The level measured in untreated biogas using the high range Draeger tubes was ~16-18,000 ppm $H_2S$ in multiple samples. Hydrogen sulfide levels in treated biogas were measured using an AMI digital $H_2S$ monitor and also with low range Draeger tubes. Low range Draeger Glass Detector tubes (Model #810146) detect $H_2S$ in the range 0.2 to 5 ppm. At 6 scfm gas flow, the AMI monitor consistently reported $H_2S$ levels in treated biogas of ~4 ppm and low range Draeger tubes recorded $H_2S$ levels in treated biogas of 0-3 ppm in multiple samples.

Example 8

Carbon dioxide capture and release by aqueous alkaline ferric iron salt solutions.

Figure 4:
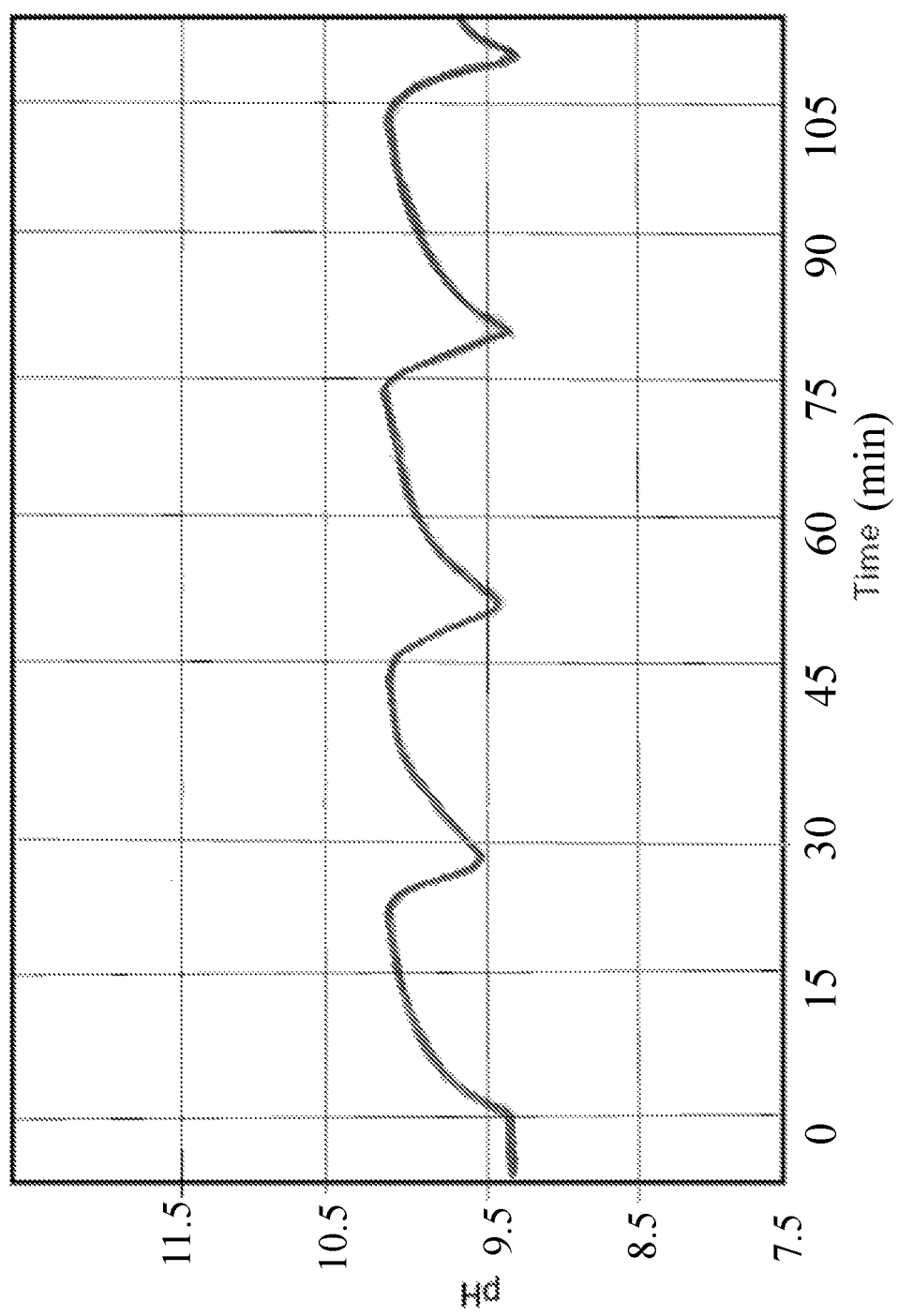
FIG. 4 is a graph illustrating pH change with carbon dioxide capture and release by aqueous alkaline ferric iron salt solutions as described in Example 8.

In both laboratory and field pilot studies, the aqueous alkaline ferric iron salt solutions used for $H_2S$ scrubbing also capture carbon dioxide during biogas gas $H_2S$-scrubbing cycles and release it during air regeneration cycles. $CO_2$ capture and release by the aqueous alkaline ferric iron salt solution has been confirmed by pH studies in batch samples in the laboratory, as well as by pH measurements and gas analyses of regeneration air streams sampled during pilot studies. A rapid 0.75-1-unit pH drop occurs when aqueous alkaline ferric iron solutions are exposed to biogas streams containing 20% or higher amounts of $CO_2$ during $H_2S$ scrubbing experiments. It is believed that the pH drop in the scrubber solution occurs because $CO_2$, an acid gas, is captured from the biogas, reacts with potassium carbonate to form potassium bicarbonate in the scrubber solution, and thus decreases the pH of the solution. During regeneration cycles, pH values of the scrubbing solution rise by 0.75-1 pH units to stable levels as $CO_2$ is released to the air. The graph provided in FIG. 4 shows regular pH swings over four $H_2S$ capture/air regeneration cycles in a batch-wise gas scrubbing experiment conducted in our laboratory. Initial pH measurements presented in this figure were later determined to be high by 1.5 pH units. Corrected pH units are provided in FIG. 4.

$CO_2$ capture/release was confirmed by similar changes in pH levels during scrubbing and regeneration cycles in pilot studies and by gas chromatographic (GC) analysis of gas samples from the air regeneration stream. The regeneration air stream was shown by GC to contain over 4% carbon dioxide, which had been removed from the biogas stream and released to the air during regeneration. Likewise, a 0.5 pH unit drop was observed in the scrubber solution during the brief biogas scrubbing cycle, followed by a similar rise during air regeneration of the used scrubber solution.

Example 9

Samples of the alkaline aqueous ferric iron salt concentrate were diluted 1:10 and 1:20 in buffer solutions containing various ratios of 0.9M potassium carbonate and 1.8M potassium bicarbonate in distilled water. The buffer ratios used were 100% (0.9144) carbonate, 100% (1.8M) bicarbonate and 4:1, 3:1, 2:1, 1:1, 1:2, 1:3, and 1:4 vol:vol carbonate:bicarbonate.

All 1:20 concentrate:buffer solutions were initially fully soluble but after 14 days iron oxide precipitates were observed in the 100% (1.8M) bicarbonate buffer, the 100% (0.9M) carbonate buffer and the 4:1 vol:vol bicarbonate-carbonate buffer. After 34 days, iron precipitates were also observed in the 3:1 vol:vol bicarbonate-carbonate buffer.

All 1:10 concentrate:buffer solutions remained soluble in all buffer mixtures with the exception of the 1:10 dilution into 100% (0.9M) carbonate buffer, which remained soluble for 56 days, but then precipitated by day 70. From these results it appears that both the 1:10 and 1:20 dilutions of iron salt concentrate into potassium carbonate-bicarbonate buffers are broadly and stably soluble across a wide range of carbonate:bicarbonate ratios, but that the 1:20 concentrate: buffer dilutions are less stable at very high and low-very low ratios of carbonate-bicarbonate buffer.

TABLE 4

Results of Dilution of Concentrate with Potassium Carbonate:Bicarbonate Buffer

| 100% (1.8M) Bicarbonate | 1 to 4 (v:v) | 1 to 3 | 1 to 2 | 1 to 1 | 2 to 1 | 3 to 1 | 4 to 1 | 100% (0.9M) Carbonate |
|---|---|---|---|---|---|---|---|---|
| Iron salt concentrate diluted 1:10 into potassium carbonate:bicarbonate buffer | | | | | | | | |
| S (soluble) pH 9.23 | S pH 9.46 | S pH 9.57 | S pH 9.74 | S pH 10.03 | S pH 10.34 | S pH 10.50 | S pH 10.67 | PPT pH 11.82 |
| Iron salt concentrate diluted 1:20 into potassium carbonate:bicarbonate buffer | | | | | | | | |
| PPT (precipitate) pH 9.27 | PPT pH 9.48 | PPT pH 9.59 | S pH 9.78 | S pH 10.06 | S pH 10.35 | S pH 10.53 | S pH 10.68 | PPT pH 11.86 |

While various embodiments of the invention described herein have been described in detail, it is apparent that modifications and adaptations of those embodiments will occur to those skilled in the art. However, it is to be expressly understood that such modifications and adaptations are within the spirit and scope of the presently disclosed invention.

The invention claimed is:

1. A method for removal of reduced sulfur compounds from a fluid containing reduced sulfur compounds comprising:
   (a) contacting an alkaline aqueous ferric iron salt solution that contains anionic ferric iron-carbonate complexes with a reduced sulfur-containing fluid;
      (i) wherein the alkaline aqueous ferric iron salt solution comprises ferric ions ($Fe^{3+}$), potassium ions ($K^+$), carbonate ions ($CO_3^{2-}$) and bicarbonate ions ($HCO^{3'}$) and one or more organic additives;
      (ii) wherein a molar ratio of the potassium ions to the ferric ions is at least 1.0;
      (iii) wherein a molar ratio of ferric ions to a sum total of the one or more organic additives is greater than 1;
      (iv) wherein the alkaline aqueous ferric iron salt solution is a fully soluble aqueous alkaline ferric iron salt solution;
      (v) wherein the alkaline aqueous ferric iron salt solution has a pH of at least 8:
   (b) producing, due to the contacting, a reduced alkaline iron solution, wherein the producing comprises:
      (i) forming one or more iron sulfide compounds in the alkaline aqueous ferric iron salt solution to thereby remove at least a portion of the reduced sulfur compounds from the reduced sulfur-containing fluid; and
      (ii) oxidizing at least a portion of the at least one reduced sulfur compound and reducing at least a portion of the ferric ions to ferrous ions ($Fe^{2+}$).

2. The method of claim 1, further comprising, after removal of at least a portion of the reduced sulfur compounds from the fluid,
   (c) oxidizing at least a portion of ferrous iron formed in the at least partially reduced alkaline aqueous ferric iron solution to at least in part regenerate the alkaline aqueous ferric iron salt solution with concomitant oxidation of at least a portion of the sulfide of iron sulfide in the at least partially reduced alkaline aqueous ferric iron solution to elemental sulfur.

3. The method of claim 2, wherein the regenerated alkaline aqueous ferric iron salt solution is free of iron oxide-based or iron oxyhydroxide-based particles.

4. The method of claim 2, wherein oxidizing at least a portion of the ferrous ions comprises exposing the at least partially reduced alkaline aqueous ferric iron solution to an oxidizing agent to oxidize at least a portion of the ferrous ions therein to ferric ions, thereby producing a regenerated alkaline aqueous ferric iron salt solution, wherein the exposing comprises producing the elemental sulfur.

5. The method of claim 1, wherein the one or more organic additives are selected from the groups consisting of a polyol, an extract of a fruit, leaves or roots of a fruit, and any combination thereof, a pectin from any source, and an aminopolycarboxylic acid.

6. The method of claim 1, wherein the alkaline aqueous ferric iron salt solution has a pH of at least 9.

7. The method of claim 1, wherein the at least one reduced sulfur compound comprises $H_2S$.

8. The method of claim 1, wherein a flow of reduced sulfur-containing fluid is contacted with the alkaline aqueous ferric iron salt solution for a selected contact time to remove the at least one reduced sulfur compound from the reduced sulfur-containing fluid to provide a purified fluid and thereafter iron sulfide(s) is oxidized in the at least partially reduced alkaline aqueous ferric iron solution to at least in part regenerate the alkaline aqueous ferric iron salt solution.

9. The method of claim 1, wherein the alkaline aqueous ferric iron salt solution further comprises nitrate ions ($NO_3^-$).

10. The method of claim 1, wherein a molarity of ferric ions in the alkaline aqueous ferric iron salt solution is from 0.005 to 3.0 mols/L.

11. The method of claim 1, wherein the alkaline aqueous ferric iron salt solution comprises the one or more organic additives, wherein a molar ratio of ferric ions to each organic additive is 2 or more.

* * * * *